US010560509B2

(12) United States Patent
Lo et al.

(10) Patent No.: US 10,560,509 B2
(45) Date of Patent: Feb. 11, 2020

(54) METHOD AND APPARATUS FOR USING HTTP REDIRECTION TO MEDIATE CONTENT ACCESS VIA POLICY EXECUTION

(71) Applicant: QUALCOMM Incorporated, San Diego, CA (US)

(72) Inventors: Charles Nung Lo, San Diego, CA (US); Thomas Stockhammer, Bergen (DE); Kevin Roland Fall, Pittsburgh, PA (US); Carlos Marcelo Dias Pazos, Carlsbad, CA (US); Jun Wang, Poway, CA (US); Nikolai Konrad Leung, Takoma Park, MD (US); Gordon Kent Walker, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 666 days.

(21) Appl. No.: 14/264,132

(22) Filed: Apr. 29, 2014

(65) Prior Publication Data
US 2015/0012584 A1    Jan. 8, 2015

Related U.S. Application Data

(60) Provisional application No. 61/843,314, filed on Jul. 5, 2013.

(51) Int. Cl.
*H04L 29/08*    (2006.01)

(52) U.S. Cl.
CPC .................................. *H04L 67/02* (2013.01)

(58) Field of Classification Search
USPC ......................................................... 709/203
See application file for complete search history.

(56) References Cited

U.S. PATENT DOCUMENTS

| 2002/0091798 | A1* | 7/2002 | Joshi ................. G06F 17/30867 709/219 |
| 2005/0086197 | A1* | 4/2005 | Boubez ................... H04L 63/10 |
| 2005/0138137 | A1* | 6/2005 | Encarnacion ..... G06F 17/30887 709/217 |
| 2006/0195556 | A1* | 8/2006 | Shamia ................... H04L 29/06 709/220 |
| 2012/0207088 | A1* | 8/2012 | Liu ......................... H04L 67/02 370/328 |
| 2012/0263089 | A1 | 10/2012 | Gupta et al. |
| 2013/0007814 | A1 | 1/2013 | Cherian et al. |

(Continued)

OTHER PUBLICATIONS

Dominique Guinard, Vlad Trifa and Erik Wilde, "A Resource Oriented Architecture for the Web of Things", 978-1-4244-7414-1/10 2010 IEEE.*

(Continued)

*Primary Examiner* — Umar Cheema
*Assistant Examiner* — John Fan
(74) *Attorney, Agent, or Firm* — The Marbury Law Group, PLLC

(57) ABSTRACT

Systems, methods, and devices of the various embodiments enable HTTP redirect messages to indicate content access policy information. In this manner, policy rules may be implemented based on the policy information in the HTTP redirect messages to control network congestion and/or quality of service ("QOS").

20 Claims, 19 Drawing Sheets

(56) References Cited

U.S. PATENT DOCUMENTS

2013/0103785 A1* 4/2013 Lyon ................ H04N 21/2385
709/217
2013/0182643 A1 7/2013 Pazos et al.
2013/0294321 A1 11/2013 Wang et al.

OTHER PUBLICATIONS

K. Fall, Co-pending U.S. Appl. No. 14/153,888, filed Jan. 13, 2014. (Publication No. 2014-0201323 A1).
Co-pending U.S. Appl. No. 14/302,502, filed Jun. 12, 2014.
Co-pending U.S. Appl. No. 14/305,557, filed Jun. 16, 2014. (unpublished).

* cited by examiner

| VALIDITYTIME | TARGETAREA | PROXY BEHAVIOR |
|---|---|---|
| @duration IS PRESENT | - | ALTERNATIVE RESOURCE IS INCLUDED IN 300 ENTITY BODY SENT TO HTTP CLIENT UNTIL THE EXPIRATION OF @duration |
| @startTime, @endTime ARE PRESENT | - | ALTERNATIVE RESOURCE IS INCLUDED IN 300 ENTITY BODY SENT TO HTTP CLIENT FROM [@endTime - @startTime] |
| - | SERVICEAREA OR CELLID IS PRESENT; @polarity = 1 | ALTERNATIVE RESOURCE IS INCLUDED IN 300 ENTITY BODY SENT TO HTTP CLIENT AS LONG AS UE IS LOCATED INSIDE TARGET AREA |
| - | SERVICEAREA OR CELLID IS PRESENT; @polarity = 0 | ALTERNATIVE RESOURCE IS INCLUDED IN 300 ENTITY BODY SENT TO HTTP CLIENT AS LONG AS UE IS LOCATED OUTSIDE TARGET AREA(S) |
| - | SERVICEAREA AND CELLID ARE PRESENT; @polarity = 1 | ALTERNATIVE RESOURCE IS INCLUDED IN 300 ENTITY BODY SENT TO HTTP CLIENT AS LONG AS UE IS LOCATED INSIDE EITHER TARGET AREA |
| - | SERVICEAREA AND CELLID ARE PRESENT; @polarity = 0 | ALTERNATIVE RESOURCE IS INCLUDED IN 300 ENTITY BODY SENT TO HTTP CLIENT AS LONG AS UE IS LOCATED OUTSIDE BOTH TARGET AREAS |
| @duration OR [@endTime, @startTime] IS PRESENT | SERVICEAREA OR CELLID IS PRESENT; @polarity = 1 | ALTERNATIVE RESOURCE IS INCLUDED IN 300 ENTITY BODY SENT TO HTTP CLIENT FOR CORRESPONDING TIME INTERVAL THAT UE IS LOCATED INSIDE TARGET AREA |
| @duration OR [@endTime, @startTime] IS PRESENT | SERVICEAREA OR CELLID IS PRESENT; @polarity = 0 | ALTERNATIVE RESOURCE IS INCLUDED IN 300 ENTITY BODY SENT TO HTTP CLIENT FOR CORRESPONDING TIME INTERVAL THAT UE IS LOCATED OUTSIDE TARGET AREA(S) |
| @duration OR [@endTime, @startTime] IS PRESENT | SERVICEAREA AND CELLID ARE PRESENT; @polarity = 1 | ALTERNATIVE RESOURCE IS INCLUDED IN 300 ENTITY BODY SENT TO HTTP CLIENT FOR CORRESPONDING TIME INTERVAL THAT UE IS LOCATED INSIDE EITHER TARGET AREA |
| @duration OR [@@endTime, @startTime] IS PRESENT | SERVICEAREA AND CELLID ARE PRESENT; @polarity = 0 | ALTERNATIVE RESOURCE IS INCLUDED IN 300 ENTITY BODY SENT TO HTTP CLIENT FOR CORRESPONDING TIME INTERVAL THAT UE IS LOCATION OUTSIDE BOTH TARGET AREAS |

FIG. 13

METHOD AND APPARATUS FOR USING HTTP REDIRECTION TO MEDIATE CONTENT ACCESS VIA POLICY EXECUTION

RELATED APPLICATIONS

This application claims the benefit of priority to U.S. Provisional Patent Application No. 61/843,314 entitled "Method and Apparatus for Using HTTP Redirection to Mediate Content Access via Policy Execution" filed Jul. 5, 2013, the entire contents of which are hereby incorporated by reference.

BACKGROUND

The Hypertext Transfer Protocol ("HTTP") (as defined in Internet Engineering Task Force ("IETF") Request for Comments 2616 entitled "Hypertext Transfer Protocol—HTTP/1.1", published June 1999) is currently a popular method of delivering content over the Internet. In many current applications, such as streaming, content is made available progressively through constant duration segments. The segment availability follows a timeline that indicates when each successive segment becomes available in the HTTP server.

Dynamic Adaptive Streaming Over Hypertext Transfer Protocol ("DASH") is a standard that implements HTTP streaming. DASH announces the segment availability in a Media Presentation Description ("MPD"). The MPD describes the media components associated with a DASH media presentation, and declares a segment availability timeline that announces the segments, the times segments are available, and the size of the segments. To gather a segment needed to render the content, a DASH enabled application/client running on a receiver device sends an HTTP request to an HTTP server to request a segment identified in the MPD. The HTTP server responds with the requested segment or responds with an HTTP redirect message indicating another Uniform Resource Locator ("URL") that the DASH client should use in a subsequent HTTP request for the segment. DASH allows more than one representation of each segment to be made available. For example, more than one representation of each segment may be made available by hosting a high bit rate/quality version of a segment at one location and a low bit rate/quality version of the same segment at another location. A DASH application/client may retrieve either the high bit rate/quality version or the low bit rate/quality version of the segment and render either version.

SUMMARY

The systems, methods, and devices of the various embodiments enable HTTP redirect messages to indicate content access policy information. In this manner, policy rules may be implemented based on the policy information in the HTTP redirect messages to control network congestion and/or quality of service ("QoS").

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 13 is a data structure diagram illustrating potential elements of a redirect handling rules table.

DETAILED DESCRIPTION

Figure 1:
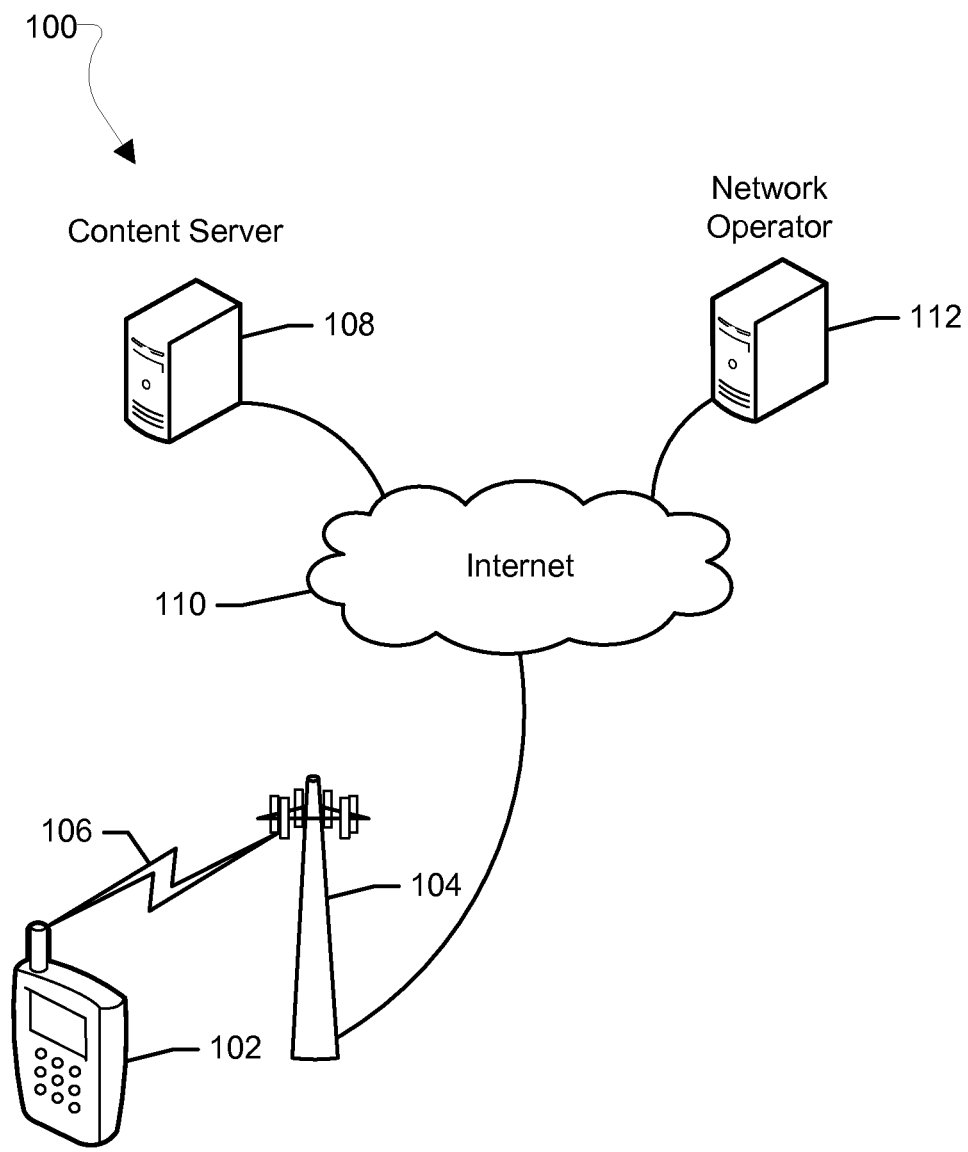
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the term "receiver device" is used to refer to any one or all of cellular telephones, smart phones, personal or mobile multi-media players, personal data assistants ("PDAs"), personal computers, laptop computers, tablet computers, smart books, palm-top computers, wireless electronic mail receivers, multimedia Internet enabled cellular telephones, wireless gaming controllers, personal computers, television set top boxes, televisions, cable television receivers, and similar personal electronic devices which include a programmable processor and memory and circuitry for receiving files and providing files to requesting applications/clients, such as requesting DASH clients.

The various embodiments are described herein using the term "server." The term "server" is used to refer to any computing device capable of functioning as a server, such as a master exchange server, web server, mail server, document server, content server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on mobile devices. A light server or secondary server may be a slimmed-down version of server type functionality that can be implemented on a mobile device thereby enabling it to function as an Internet server (e.g., an enterprise e-mail server) only to the extent necessary to provide the functionality described herein.

As used herein, the terms "segment," "object," and "file" are used interchangeably herein to refer to any one or all data structures or data units that may be requested from a server.

Dynamic Adaptive Streaming Over Hypertext Transfer Protocol ("DASH") is a standard that implements HTTP streaming. DASH announces the segment availability in a Media Presentation Description (MPD). The MPD describes the media components associated with a DASH media presentation, and declares a segment availability timeline that announces the segments, the times segments are available, and the size of the segments. The Third Generation Partnership Project ("3GPP") has standardized DASH over Download Delivery as a method to be used for providing HTTP streaming using broadcast over Long Term Evolution ("LTE") (i.e., evolved Multimedia Broadcast Multicast Services ("eMBMS")).

Various examples of different applications/clients, middleware, segment availability timelines, radio technologies, and transport protocols are discussed herein, specifically DASH clients, Multicast Service Device Clients, MPDs, eMBMS, and HTTP. The discussions of DASH clients, Multicast Service Device Clients, MPDs, eMBMS, and HTTP are provided merely as examples to better illustrated the aspects of the various embodiments, and are not intended to limit the various embodiments in any way. Other applications/clients, middleware, segment availability timelines, radio technologies, and transport protocols may be used with the various embodiments, and the other applications/clients, middleware, segment availability timelines, radio technologies, and transport protocols may be substituted in the various examples without departing from the spirit or scope of the invention.

The various embodiments enable HTTP redirect messages to indicate content access policy information. In this manner, policy rules may be implemented based on the policy information in the HTTP redirect messages to control network congestion and/or quality of service ("QoS").

An HTTP application/client running on a processor of a receiver device may send HTTP Get( ) requests to an HTTP server to request a file associated with a specific address, such as a Uniform Resource Locator ("URL") and/or Uniform Resource Indicator ("URI"). As an example, the HTTP application/client may be a DASH client, and the DASH client may send a Get( ) request indicating the URL and/or URI for a next segment of a media presentation being rendered by the DASH client to a network server hosting segments of the media presentation.

In an embodiment, when network congestion is detected and/or anticipated by a network monitor and/or redirect controller, the network monitor and/or redirect controller may indicate to an HTTP server an occurrence of a network congestion event. In response to receiving an indication of a network congestion event the HTTP server may send HTTP redirect messages (e.g., HTTP 3xx series status coded messages) indicating one or more alternative resource ID and access policy information in response to received HTTP Get( ) requests. In an embodiment, the one or more alternative resource IDs and access policy information in the HTTP redirect messages (e.g., HTTP 3xx series status coded messages) may be generated by the HTTP server based on response settings stored in a memory available to the HTTP server. In this manner, response settings used by the HTTP server to generate the HTTP redirect messages may be used to control how the HTTP server responds to network events, such as network congestion events. Access policy information may be information that may be used to control and/or mediate an HTTP application/client's content requests. Access policy information may include rules, preferences, and/or other metadata. As examples, access policy information may be time based rules, location based rules, cost indication, priority rules, network preferences, etc. In an embodiment, a network monitor and/or redirect controller may send updates to the response settings to control the content of HTTP redirect messages generated by the HTTP server. In this manner, the response of the HTTP server to network events, such as network congestion events, may be tailored by network operators using response setting updates.

In an embodiment, an HTTP redirect message (e.g., an HTTP 3xx series status coded message) may include two or more alternative resource IDs and access policy information, and an HTTP application/client (e.g., a DASH client) may be configured to use the access policy information within the HTTP redirect message to choose among the two or more alternative resource IDs. As an example, a DASH client may send a Get( ) request for a segment to a server, and in response DASH client may receive an HTTP 300 redirect message including multiple alternative resource Uniform Resource Identifiers ("URIs") each associated with alternative versions of the requested segment and validity times for each alternative resource URI. The DASH client may select one of alternative resource URIs that is currently valid based on a current network time and send a new HTTP Get( ) request for the alternative segment associated with the selected alternative resource URI to the server.

In an additional embodiment, the HTTP application/client (e.g., a DASH client) may be configured to use access policy information within the HTTP redirect message and/or redirect handling rules to choose among the two or more alternative resource IDs. As an example, an HTTP 300 redirect message may include a first URI associated with access policy information indicating the alternative resource associated with the first URI is available at no cost and a second URI associated with access policy information indicating the alternative resource associated with the second URI is available for a fee. A redirect handling rule stored in a memory available to a DASH client may indicate that the DASH client is to request only resources that are available at no cost. Based on the cost indications in the access policy information and the redirect handling rule, the DASH client may select the first alternative resource URI because it is indicated as being available at no cost, and send a new HTTP Get( ) request for the cost free alternative resource associated with the first URI.

In a further embodiment, the HTTP application/client (e.g., a DASH client) may be configured to use access policy information within the HTTP redirect message, redirect handling rules, and/or other information (e.g., application settings, user profile information, subscription settings, etc.) to choose among the two or more alternative resource IDs.

In an embodiment, the HTTP application/client (e.g., a DASH client) may update the representation information associated with a media stream based on a received redirect. As an example, a DASH client may receive an HTTP redirect message (e.g., an HTTP 3xx series status coded message) indicating that an originally requested segment of a media presentation is not available and providing indication of an alternate resource, such as different bandwidth representation of the originally requested segment. The DASH client may select an alternate resource (e.g., a higher bandwidth representation) and may update the MPD to indicate that the representation for the originally requested segment is no longer available. In this manner, the DASH client may prevent future requests for segments of a representation that may result in future redirects because the MPD may no longer indicate that representation is available. As another example, the HTTP application/client (e.g., a DASH client) may update the representation information associated with a media stream (e.g., an MPD) by replacing resource availability information (e.g., host server address, resource IDs, etc.) for a representation associated with a received redirect message with resource availability information (e.g., host server address, resource IDs, etc.) for the alternative resource or resources indicated in the redirect message.

In another embodiment, an HTTP redirect message (e.g., an HTTP 3xx series status coded message) may include two or more alternative resource IDs and access policy information, and an HTTP proxy may be configured to use the access policy information within the HTTP redirect message to choose among the two or more alternative resource IDs. In a further embodiment, the HTTP proxy may be configured to use the access policy information within the HTTP redirect message, redirect handling rules, and/or other information to choose among the two or more alternative resource IDs. The HTTP proxy may generate an HTTP redirect message indicating the selected alternative resource ID that may not include access policy information. Alternatively, the HTTP proxy may generate an HTTP redirect message indicating multiple selected alternative resource IDs and including access policy information applicable to the selected alternative resource IDs. In an embodiment, the HTTP proxy may be a server module running as middleware on a processor of a receiver device, such as a standalone server module and/or a server module that is part of a connection client (e.g., an Multimedia Broadcast Multicast Services ("MBMS") client).

As an example, the HTTP proxy may be a module of an MBMS client running on a processor of a receiver device. A DASH client may send an HTTP Get( ) for a segment via the MBMS client and an LTE network to an HTTP server. In response to receiving the HTTP Get( ) for the segment, the HTTP server may send an HTTP 300 redirect message to the MBMS client including multiple alternative resource Uniform Resource Identifiers ("URIs") each associated with alternative versions of the requested segment and access policy information. The HTTP proxy module of the MBMS client may receive the HTTP 300 redirect message and select one of the alternative resource URIs based at least in part on the access policy information. The HTTP proxy module of the MBMS client may generate an HTTP 303 redirect message including the selected alternative resource URI, but without access policy information, and send the HTTP 303 redirect message to the DASH client. In response to receiving the HTTP 303 redirect message, the DASH client may send a new Get( ) request for the alternative segment associated with the selected alternative resource.

As an alternative example, the HTTP proxy module of the MBMS client may receive the HTTP 300 redirect message and select multiple alternative resource URIs based at least in part on the access policy information. The HTTP proxy module of the MBMS client may generate an HTTP 300 redirect message including the multiple selected alternative resource URIs and access policy information associated with the multiple selected alternative resource URIs, and send the HTTP 300 redirect message to the DASH client. In response to receiving the HTTP 300 redirect message, the DASH client may select one of the multiple selected alternative resource URIs based at least in part on the access policy information and send a new Get( ) request for an alternative segment associated with the selected one of the multiple selected alternative resource.

As another example, the HTTP proxy may be a separate module running on a processor of a receiver device, independent of an MBMS client running on the processor of the receiver device. The HTTP proxy may interact with the MBMS client via an application programming interface ("API") enabling the HTTP proxy and MBMS client to exchange instructions and/or information. A DASH client may send an HTTP Get( ) for a segment via the HTTP proxy to an HTTP server. In response to receiving the HTTP Get ( ) for the segment, the HTTP server may send an HTTP 300 redirect message to the HTTP server including multiple alternative resource Uniform Resource Identifiers ("URIs"), each associated with alternative versions of the requested segment, and access policy information. The HTTP proxy may receive the HTTP 300 redirect message and select one of the alternative resource URIs based at least in part on the access policy information. The HTTP proxy may generate an HTTP 303 including the selected alternative resource URI, but without access policy information, and send the HTTP 303 redirect message to the DASH client. In response to receiving the HTTP 303 redirect message, the DASH client may send a new Get( ) request for the alternative segment associated with the selected alternative resource via the HTTP proxy to the MBMS client.

Whether the HTTP proxy is a standalone module or a module of a connection client (e.g., an MBMS client), HTTP redirect messages, such as the HTTP 300 redirect messages and the HTTP 303 redirect messages discussed in the previous examples, may be used to redirect an HTTP client (e.g., a DASH client) from unicast version(s) of segments to broadcast version(s) of segments (e.g., demand-based MBMS broadcast representation(s)). As another example, the redirection to broadcast version(s) of segments may be implemented by the HTTP proxy upon determining the receiver device has moved into a broadcast coverage area and the access policy requires that only broadcast representation(s) be accessed. In such an example, the redirection to broadcast version(s) of segments may be implemented by the HTTP proxy even though a DASH client of the receiver device may be operating a DASH over MBMS user service with unicast fallback delivery.

In an embodiment, the HTTP proxy may be a server module running on a processor of a gateway connected to a network, such as an in-home gateway (e.g., a wireless and/or wired router) connected to the Internet. The gateway may be connected via wired and/or wireless connections to receiver devices running HTTP applications/clients (e.g., DASH clients). The HTTP applications/clients running on the receiver devices may send HTTP Get( ) requests for resources to an HTTP server connected to the network via the gateway. In response to an HTTP Get( ) request, the HTTP server may send an HTTP redirect message (e.g., an HTTP 3xx series status coded message) including two or more alternative resource IDs and access policy information to the gateway via the network. The HTTP proxy running on the processor of the gateway may receive the HTTP redirect message (e.g., an HTTP 3xx series status coded message) including two or more alternative resource IDs and access policy information, and the HTTP proxy may be configured to use the access policy information within the HTTP redirect message, redirect handling rules, and/or other information to choose among the two or more alternative resource IDs. The HTTP proxy may generate an HTTP redirect message indicating the selected alternative resource ID that may not include access policy information, and may send the HTTP redirect message indicating the selected alternative resource ID to the receiver device and HTTP client/application that originated the original HTTP Get( ) request.

In an embodiment, the HTTP proxy may be a network server controlling delivery of resources to a receiver device. The HTTP proxy may be in communication with a redirect controller, such as a Policy and Charging Rules Function ("PCRF") server in a cellular communication network, such as a Long Term Evolution (LTE) network. The redirect controller may send network information to the HTTP proxy, such as network congestion information, subscription information, receiver device location information, user profile information, etc. The HTTP proxy may receive an HTTP redirect message (e.g., an HTTP 3xx series status coded message) from another network server hosting a resource, and the HTTP redirect message may include two or more alternative resource IDs and access policy information. The HTTP proxy may be configured to use the access policy information within the HTTP redirect message, network information, redirect handling rules, and/or other information to choose among the two or more alternative resource IDs. The HTTP proxy may generate an HTTP redirect message indicating the selected alternative resource ID that may not include access policy information and may send the HTTP redirect message to an HTTP application/client running on a processor of a receiver device in communication with the network.

As an example, a DASH client running on a processor of a receiver device may send an HTTP Get( ) request for a segment of a media presentation via an LTE network to an HTTP server of the LTE network hosting segments of the media presentation. A PCRF server of the LTE network may send an indication of a network congestion event, such as current high network traffic, to the HTTP server. In response to receiving the indication of the network congestion event from the PCRF server, the HTTP server may send an HTTP 300 redirect message including multiple alternative resource URIs each associated with alternative versions of the requested segment and access policy information in response to the HTTP Get( ) request from the DASH client to an HTTP proxy server in the LTE network. The HTTP proxy server may receive information from the PCRF server, such as network congestion information (e.g., a network congestion level, etc.), Quality of Service information, location information (e.g., current service area of the receiver device, current cell of the receiver device, etc.), cost information, subscriber information (e.g., subscription level of the plan associated with the receiver device), etc. The HTTP proxy server may then select one of the alternative resource URI based on the access policy information and information received from the PCRF server. The HTTP proxy server may generate an HTTP 303 redirect message including the selected alternative resource URI, but without access policy information, and send the HTTP 303 redirect message to the DASH client via the LTE network. In response to receiving the HTTP 303 redirect message, the DASH client may send a new Get( ) request for the alternative segment associated with the selected alternative resource via the LTE network to the HTTP server.

In an embodiment, a network side HTTP proxy server controlling delivery of resources to a receiver device may send HTTP redirect messages to a local HTTP proxy running on a processor of the receiver device. The local HTTP proxy may receive HTTP redirect messages from the network side HTTP proxy server and send HTTP redirect messages to an HTTP application/client running on the processor of the receiver device. The network side HTTP proxy server may be in communication with a redirect controller, such as a policy and charging rules function ("PCRF") server. The redirect controller may send network information, such as network congestion information, subscription information, receiver device location information, user profile information, etc., to the network side HTTP proxy server. The network side HTTP proxy server may receive an HTTP redirect message (e.g., an HTTP 3xx series status coded message) from another network server hosting a resource, and the HTTP redirect message may include two or more alternative resource IDs and access policy information. The network side HTTP proxy server may be configured to use the access policy information within the HTTP redirect message, network congestion information, redirect handling rules, and/or other information to choose among the two or more alternative resource IDs. The network side HTTP proxy server may generate an HTTP redirect message indicating multiple selected alternative resource IDs and access policy information associated with those multiple selected alternative resource IDs. The network side HTTP proxy server may send the HTTP redirect message indicating multiple selected alternative resource IDs to the local HTTP proxy running on the processor of the receiver device. The local HTTP proxy may choose among the two or more alternative resource IDs based on the access policy information associated with the multiple selected alternative resource IDs, network information, redirect handling rules, and/or other information available to the local HTTP proxy.

In an embodiment, the local HTTP proxy may select one of the multiple selected alternative resource IDs in the HTTP redirect message received from the network side HTTP proxy server, and may send a redirect to an HTTP application/client running on a processor of the receiver device indicating the one selected alternative resource ID without access policy information. As an example, the local HTTP proxy may send an HTTP 303 redirect message indicating only one selected alternative resource ID without access policy information. The HTTP application/client receiving the HTTP 303 redirect message may generate an HTTP Get ( ) request for the alternative resource associated with the single indicated alternative resource ID.

In another embodiment, the local HTTP proxy may select two or more of the multiple selected alternative resource IDs in the HTTP redirect message received from the network side HTTP proxy server based on the access policy information, network information, redirect handling rules, and/or other information available to the local HTTP proxy, and may send a redirect to an HTTP application/client running on a processor of the receiver device indicating the two or more selected alternative resource IDs and access policy information associated with the two or more selected alternative resource IDs. As an example, the local HTTP proxy may send an HTTP 300 redirect message indicating only the two or more selected alternative resource ID and access policy information associated with the two or more selected alternative resource IDs. The HTTP application/client receiving the HTTP 300 redirect message may select one of the two or more selected alternative resource IDs based on the access policy information, network congestion information, redirect handling rules, and/or other information available to the HTTP application/client, and may generate an HTTP Get( ) request for the alternative resource associated with the HTTP application/client selected alternative resource ID. As an example, the HTTP 300 redirect message may include access policy information indicating a cost associated with each of the two or more selected alternative resource IDs and the HTTP application/client may select the alternative resource ID with the lowest cost based on a user setting to minimize download charges. As another example, the HTTP application/client may be a DASH client, and information in the HTTP 300 redirect may include network information, such as a current bandwidth estimate, an explicit indication of a minimum guaranteed bit rate for delivering resources, and/or an explicit indication of a maximum instantaneous bit rate available for delivering the resources. The DASH client may use information in the MPD available to the DASH client indicating the maximum and minimum data rates and the network information to determine a most suitable alternate resource for download and select an alternate resource ID for that most suitable alternate resource.

In an embodiment, an HTTP proxy may include or have access to a memory storing copies of resources provided by and/or requested via the HTTP proxy, and the HTTP proxy may be configured to determine whether any resources copies of resources in the memory match a requested resource. When a copy of the resource in the memory matches the requested resource, the HTTP proxy may respond to the request for the resource with the copy stored in the memory. In this manner, an HTTP proxy may provide a copy of the resource even when network policy may prevent delivery of a requested resource from another device. As an example, the HTTP proxy may be an HTTP proxy included on a gateway device, such as a router, and the HTTP proxy may have access to a cache of resources previously provided by the gateway device to receiver devices connected to the gateway device. In such a situation, the HTTP proxy may receive a request for a segment of a media presentation from a receiver device connected to the gateway device, and the HTTP proxy may determine that network policy does not allow the requested segment to be provided to the receiver device (e.g., the subscriber level is too low, the bandwidth is not available, the segment is not available in the service area, etc.) In that case, the HTTP proxy may determine whether the memory of the gateway device includes a copy of the requested segment, as may occur when another receiver device requested the same segment earlier and a copy remains stored in the gateway device's memory. The HTTP proxy may respond to the request from the receiver device with the stored copy of the segment from the gateway device memory. As another example, the HTTP proxy may be a local HTTP proxy running on a receiver device, and may receive an HTTP 3xx series redirect message indicating that the requested version of a DASH segment is not available and providing alternate resources. The local HTTP proxy may determine whether a memory on the receiver device hosting the local HTTP proxy includes a stored copy of the requested version of the DASH segment, and may respond to the DASH client that sent the original request with the copy of the requested version of the DASH segment from the receiver device memory upon determining that the memory does include a copy of the requested version of the DASH segment. As a further example, a network-based HTTP proxy may include a caching capability for storing copies of resources provide via the network based HTTP proxy. When network policy prevents the network-based HTTP proxy from requesting the resource from another HTTP server and/or another HTTP server responds with a HTTP redirect message indicating the requested resource is not available, the network-based HTTP proxy may determine whether a copy of the requested resource is available in the cache of the HTTP proxy. In response to determining that a copy of the resource is available in the cache of the HTTP proxy, the HTTP proxy may respond to the request with the cached copy of the requested resource.

Redirect handling rules may govern how access policy information may be used to choose among two or more alternative resource IDs indicated in HTTP redirect messages. Redirect handling rules may direct an HTTP proxy and/or HTTP application/client to take an action to select one or more alternative resource ID indicated in an HTTP redirect message based an element of access policy information and/or a combination of elements of access policy information in an HTTP redirect message. In the various embodiments, redirect handling rules may be stored in one or more memories available to an HTTP proxy and/or an HTTP application/client. As an example, redirect handling rules may be stored in a redirect handling rules table stored in a memory available to an HTTP proxy and/or an HTTP application/client. In an embodiment, redirect handling rules may be added to, modified, and/or deleted by policy rule updates. In this manner, policy rule updates may be used to control how an HTTP proxy and/or an HTTP application/client respond to received HTTP redirect messages.

In the various embodiments, HTTP redirect messages, such as HTTP 3xx series status coded messages, may be generated using a markup language. As an example, HTTP redirect messages may be Extensible Markup Language ("XML") messages. In an embodiment, an HTTP 300 redirect message may include an entity body indicating one or more alternative resource IDs (e.g., URI/URL associated with one or more alternative resource). In a further embodiment, the entity body of the HTTP 300 direct may also access policy information providing information to support selection of one or more of the alternative resource IDs. In an embodiment, an HTTP 303 redirect message may identify one alternative resource ID (e.g., a URI/URL associated with a single alternative resource) in a location header of the HTTP 303 redirect message. While features of HTTP redirect messages may be discussed herein with reference to XML messages, HTTP redirect messages may be generated in other formats as well.

FIG. 1 illustrates a network system 100 suitable for use with the various embodiments. The cellular network system 100 may include multiple devices, such as a receiver device 102, one or more cellular towers or base stations 104, and one or more servers 108 and 112 connected to the Internet 110. The receiver device 102 may exchange data via one or more cellular connections 106, including CDMA, TDMA, GSM, PCS, 3G, 4G, LTE, or any other type connection, with the cellular tower or base station 104. The cellular tower or base station 104 may be in communication with a router that may connect to the Internet 110. In this manner, via the connections to the cellular tower or base station 104, and/or Internet 110, data may be exchanged between the receiver device 102 and the server(s) 108 and 112. In an embodiment, server 108 may be a content server or encoder providing MPDs and/or segments for output via a DASH client. In an embodiment, server 112 may be a network operator server controlling the operations of the server 108, the cellular network including the receiver device 102 and the cellular tower or base station 104 and controlling the over the air ("OTA") transmission of content to the receiver device 102. Of course, while features of receiver devices described herein may be described with reference to OTA transmissions, these features may be used in connection with wired transmissions, wireless transmissions, or a combination of wired and wireless transmissions. Thus, OTA transmission is not required.

Figure 2A:
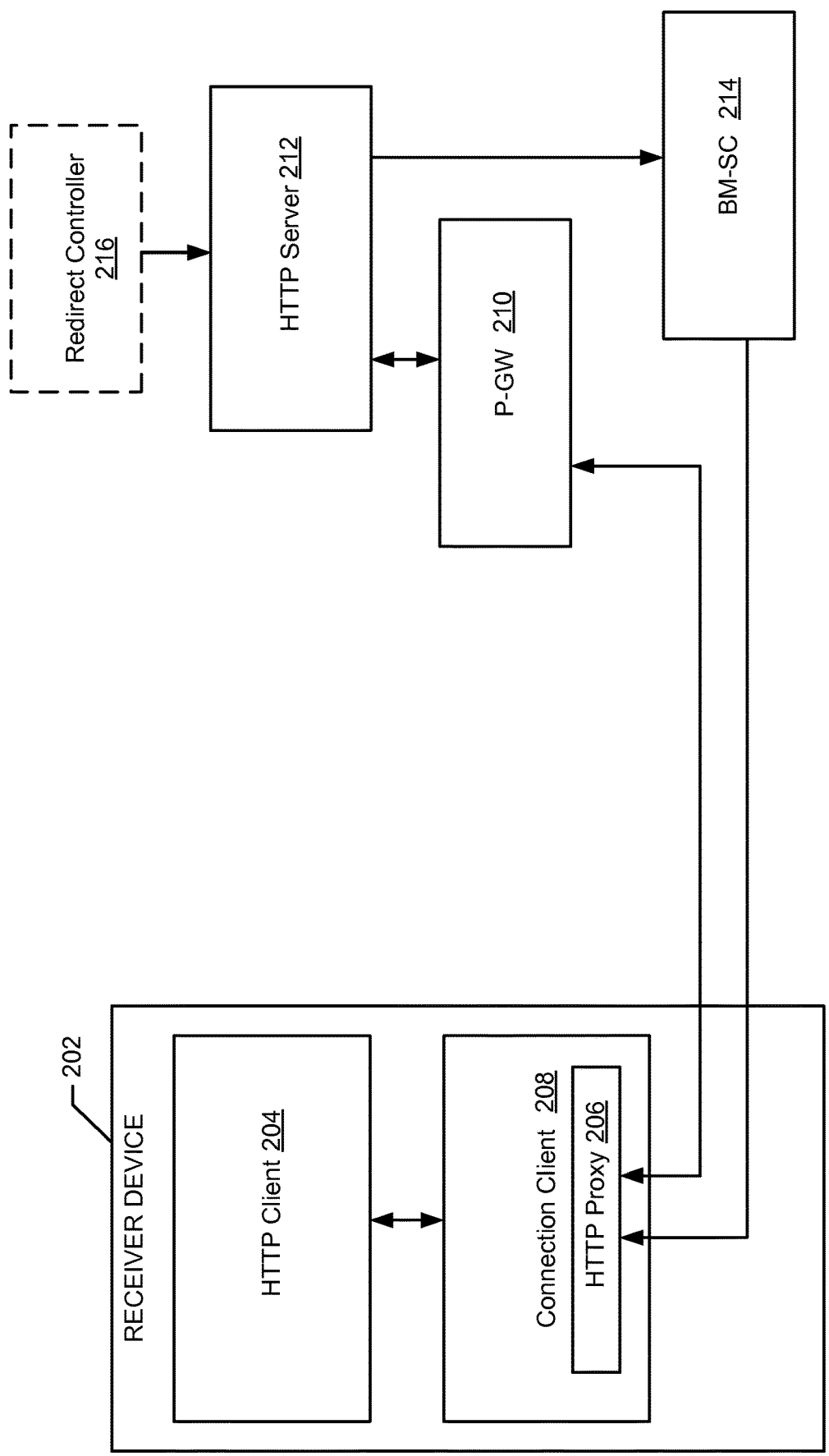
FIG. 2A is a block diagram illustrating a receiver device and network architecture according to an embodiment.

FIG. 2A illustrates a system architecture of a receiver device 202 in communication with a network according to an embodiment. The network may be a wireless network (e.g., an LTE network) providing unicast services to the receiver device 202 via a packet data network ("PDN") gateway ("P-GW") 210 and broadcast services to the receiver device 202 via a broadcast multicast service center ("BM-SC") 214. The P-GW 210 may be send and/or receive data with an HTTP server 212, and the BM-SC 214 may receive data from the HTTP server 212. As an example, the HTTP server 212 may be a server hosting resources, such as DASH media segments, and via the P-GW 210 and/or BM-SC 214 the HTTP server's 212 resources may be made available via unicast and/or broadcast transport. The HTTP server 212 may be in communication with an optional redirect controller 216 which may send data to the HTTP server 212. The redirect controller 216 may monitor a status of the network, such as an actual and/or anticipated congestion level for the network, and send network information, such as a network congestion event indication, to the HTTP server 212. In response to receiving an indication from the redirect controller 216, such as an indication of a network congestion event, the HTTP server 212 may be configured to generate HTTP redirect messages (e.g., 3xx series status coded messages) in response to received HTTP requests for one or more resources hosted by the HTTP server 212.

The receiver device 202 may include an HTTP client 204, such as a DASH client, running on a processor of the receiver device 202. The receiver device 202 may also include a connection client 208, such as a MBMS client, running on the processor of the receiver device 202. The connection client 208 may set up and control various hardware of the receiver device 202, such as one or more modems, to establish one or more unicast connection with the P-GW 210 and/or one or more broadcast connection with the BM-SC 214 to send and/or receive data via unicast and/or broadcast transmissions, respectively. In an embodiment, the connection client 208 may include an HTTP proxy 206 which may be a server module that is part of the connection client 208. The HTTP client 204 may exchange data with the connection client 208 and the HTTP proxy 206 may manage the exchange of data between the HTTP client 204 and the connection client 208 by receiving HTTP requests from the HTTP client 204 sent to the connection client 208 and replying to those requests. Additionally, the HTTP proxy 206 may control the connection client 208 to establish unicast and/or broadcast connections with the P-GW 210 and/or BM-SC 214, respectively. In this manner, via the connection client 208 and the HTTP proxy 206, the HTTP client 204 may send and/or receive data from the P-GW 210 and/or BM-SC 214.

In an embodiment, the HTTP proxy 206 may be configured to generate HTTP redirect messages based on policy rules. As an example, the HTTP client 204 may be a DASH client, and the DASH client may receive an MPD indicating a next segment of a media presentation is available in a 512 kilobit per second ("kb/s") representation, a 256 kb/s representation, and a 128 kb/s representation. The DASH client may send an HTTP Get( ) request to the connection client 208 (e.g., an MBMS client) for the 256 kb/s representation of the next segment. The HTTP proxy 206 of the connection client 208 may receive the HTTP Get( ) request for the 256 kb/s representation. The HTTP proxy 206 may match the HTTP Get( ) request for the 256 kb/s representation with the User Service Description ("USD") indicating that the 256 kb/s representation and the 128 kb/s representations are available via unicast HTTP from the P-GW 210 and HTTP server 212 and the 512 kb/s representation is delivered over broadcast delivery (e.g., via File Delivery Over Undirectional Transport ("FLUTE")) from the BM-SC 214. Response settings, such as connection policy or connection preferences, stored in a memory of the receiver device 202, may indicate a policy rule that requires broadcast reception when the receiver device 202 is in broadcast coverage, and the HTTP proxy 206 may apply the policy rule when receiving the HTTP Get( ) request for the 256 kb/s representation from the DASH client. The HTTP proxy 206 may check the status of the broadcast coverage and may identify that the receiver device 202 is in a broadcast coverage area. Based on the receiver device 202 being in the broadcast coverage area and the policy rule that requires broadcast reception when the receiver device 202 is in broadcast coverage, the HTTP proxy 206 may generate an HTTP 303 redirect message indicating the alternate resource ID for the 512 kb/s representation and send the HTTP 303 redirect message to the DASH client from the connection client 208.

The DASH client may receive the HTTP 303 redirect message and in response send a new HTTP Get( ) request for the 512 kb/s representation to the connection client 208. The connection client 208 may receive the new HTTP Get( ) request for the 512 kb/s representation, the HTTP proxy 206 may determine the request for the 512 kb/s representation is allowed based on the policy rule that requires broadcast reception when the receiver device 202 is in broadcast coverage, and the connection client 208 may provide the broadcast 512 kb/s representation of the next segment to the DASH client which may render the received 512 kb/s representation of the next segment.

In an embodiment, the HTTP client may be configured to receive an HTTP redirect message including two or more alternate resource IDs and select one of the two or more alternate resource IDs, and the HTTP proxy 206 may be configured to generate HTTP redirect messages based on policy rules. As an example, the HTTP client 204 may be a DASH client, and the DASH client may receive an MPD indicating a next segment of a media presentation is available in a 512 kb/s representation, a 256 kb/s representation, and a 128 kb/s representation. The DASH client may send an HTTP Get( ) request to the connection client 208 (e.g., an MBMS client) for the 512 kb/s representation of the next segment. The HTTP proxy 206 of the connection client 208 may receive the HTTP Get( ) request for the 512 kb/s representation. The HTTP proxy 206 may match the HTTP Get( ) request for the 512 kb/s representation with the User Service Description ("USD") indicating that the 512 kb/s representation is delivered over broadcast delivery (e.g., via FLUTE) and the 256 kb/s representation and the 128 kb/s representations are available via unicast HTTP from the P-GW 210 and HTTP server 212. Response settings, such as connection policy or connection preferences stored in a memory of the receiver device 202, may indicate a policy rule that requires broadcast reception when the receiver device 202 is in broadcast coverage, and the HTTP proxy 206 may apply the policy rule when receiving the HTTP Get( ) request for the 512 kb/s representation from the DASH client. The HTTP proxy 206 may check the status of the broadcast coverage and may identify that the receiver device 202 is not in a broadcast coverage area. Based on the receiver device 202 not being in the broadcast coverage area and the policy rule that requires broadcast reception when the receiver device 202 is in broadcast coverage, the HTTP proxy 206 may generate an HTTP 300 redirect message indicating the alternate resource IDs for both the 128 kb/s representation and 256 kb/s representation and send the HTTP 300 redirect message to the DASH client from the connection client 208. The DASH client may receive the HTTP 300 redirect message and select the alternate resource ID of the 256 kb/s representation from the alternate resource IDs of the 128 kb/s representation and the 256 kb/s representation based on other information, such as a DASH client setting indicating a preference for higher kb/s representations. In response to selecting the alternate resource ID for the 256 kb/s representation, the DASH client may send a new HTTP Get( ) request for the 256 kb/s representation to the connection client 208. The connection client 208 may receive the new HTTP Get( ) request for the 256 kb/s representation, the HTTP proxy 206 may determine the request for the 256 kb/s representation is allowed based on the policy rule and the receiver device 202 being outside broadcast coverage, and the connection client 208 may provide the unicast 256 kb/s representation of the next segment to the DASH client which may render the received 256 kb/s representation of the next segment.

Figure 2B:
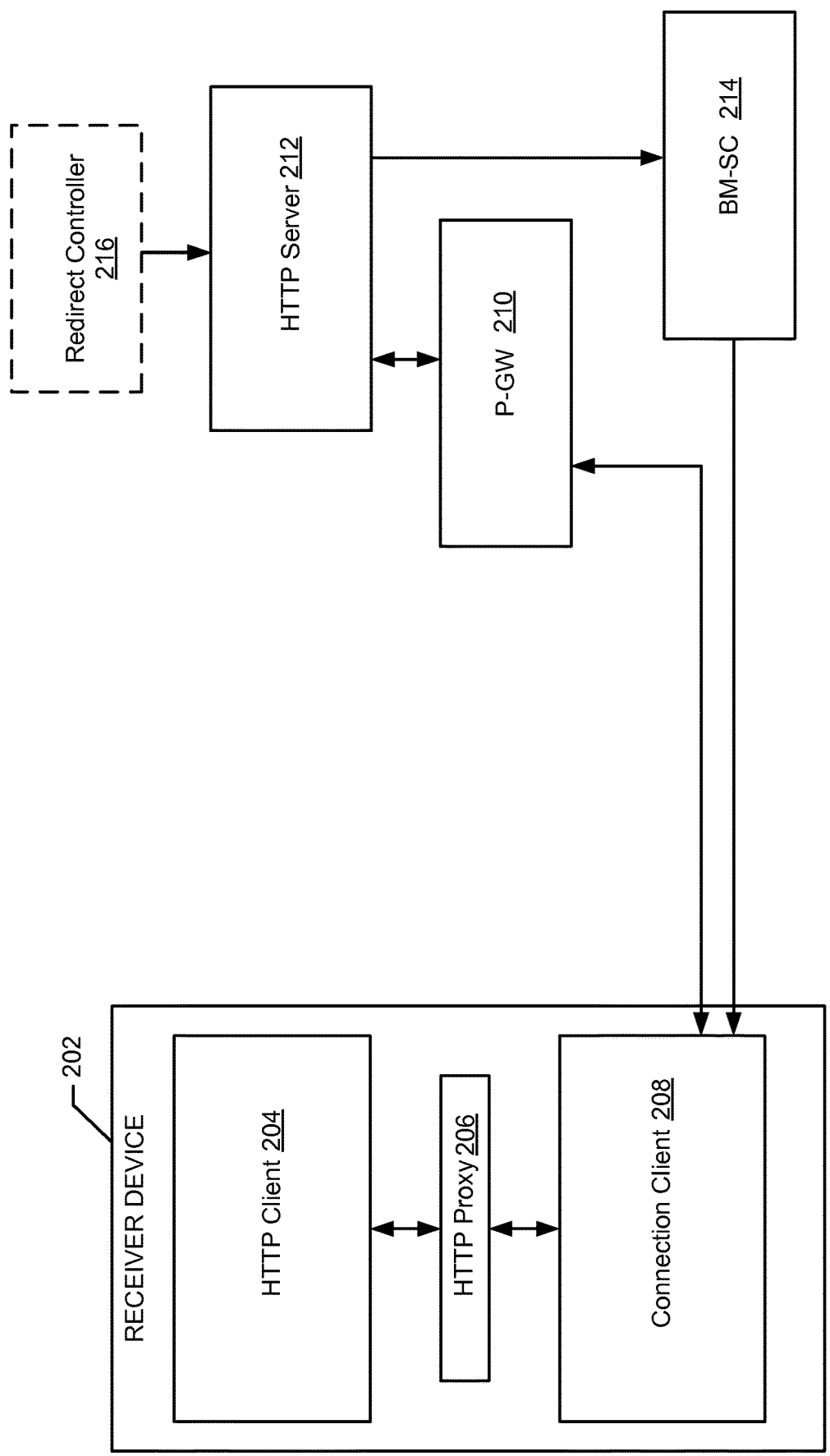
FIG. 2B is a block diagram illustrating a receiver device and network architecture according to second embodiment.

FIG. 2B illustrates an embodiment system architecture similar to that illustrated in FIG. 2A described above, except that in the system architecture illustrated in FIG. 2B the HTTP proxy 206 may be a standalone server module running on the processor of the receiver device 202 independent of the connection client 208. The HTTP proxy 206 may operate between the HTTP client 204 and connection client 208 and may interface with the HTTP client 204 and/or connection client 208 by application programming interfaces ("APIs") for the HTTP client 204 and/or connection client 208. While independent of the HTTP client 204 and/or connection client 208, the HTTP proxy 206 may exchange data with the HTTP client 204 and the connection client 208 in a similar manner as described above with reference to FIG. 2A and perform similar operations as discussed above with reference to FIG. 2A to generate redirects based on policy rules.

Figure 3:
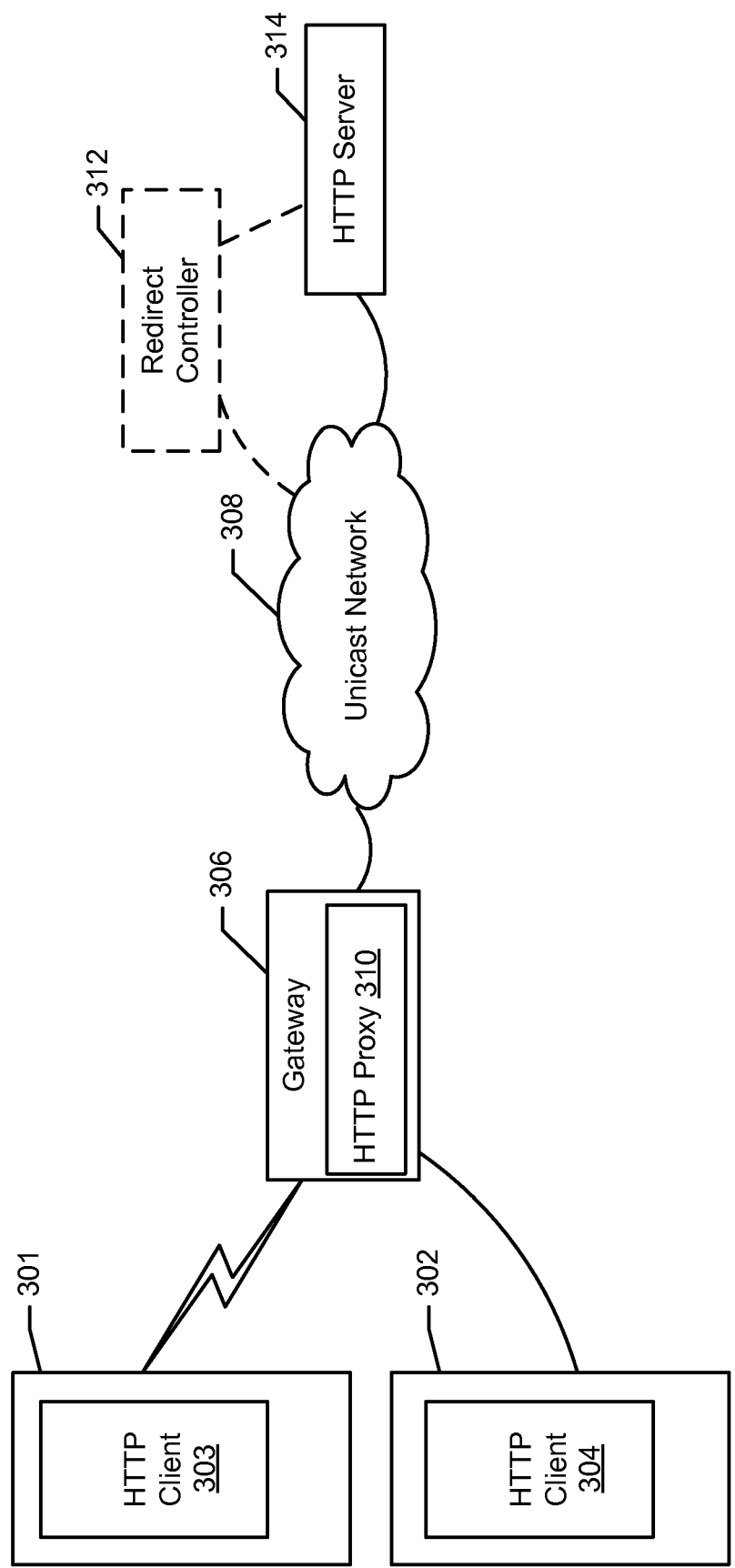
FIG. 3 is a block diagram illustrating a receiver device, gateway, and network architecture according to an embodiment.

FIG. 3 illustrates an embodiment system architecture of multiple receiver devices 301, 302 in communication with a gateway 306 including an HTTP proxy 310. While illustrated as including two receiver devices 301, 302 the system may include any number of receiver devices, such as one receiver device, three receiver devices, or more than three receiver devices. The receiver devices 301, 302 may include HTTP clients 303, 304, respectively, running on processors of the receiver devices 301, 302. The gateway 306 may be a wired and/or wireless gateway (e.g., a Wi-Fi® router) connected to a unicast network 308 (e.g., a Digital Subscriber Line ("DSL") network, etc.). An HTTP server 314 may be connected to the unicast network 308.

In an optional embodiment, an optional redirect controller 312 may be connected to the unicast network 308 and/or the HTTP server 314. The redirect controller 312 may monitor a status of the unicast network 308, such as an actual and/or anticipated congestion level for the network 308, and send network information, such as a network congestion event indication, to the HTTP server 314 and/or gateway 306.

In response to receiving an indication from the redirect controller 312, such as an indication of a network congestion event, the HTTP server 314 may be configured to generate HTTP redirect messages (e.g., 3xx series status coded messages) in response to received HTTP requests for one or more resources hosted by the HTTP server 314. Via the connections to the unicast network 308, the gateway 306, the HTTP server 314, and/or the redirect controller 312 may exchange data with one another. Via wired and/or wired connections between the receiver devices 301,302 and the gateway 306 the receiver devices 301,302 may send/receive data with the gateway 306 and included HTTP proxy 310 as well as the HTTP server 314, and/or the redirect controller 312.

In an embodiment, the HTTP proxy 310 of the gateway 306 may mediate content resource access of the HTTP clients 303, 304 running on the receiver devices 301, 302 by delivering contents to the HTTP clients 303, 304 according to available link speed between the gateway 306 and the HTTP server 314. As an example, the HTTP clients 303, 304 may be DASH clients, both rendering media available from the HTTP server 314 having segments available in 1024 kb/s representations, 512 kb/s representations, a 256 kb/s representations, and a 128 kb/s representations. The HTTP proxy 310 of the gateway 306 may have access to the MPD describing the media and available representations and may determine the current access speed available to retrieve segments from the HTTP server 314. The current access speed may be determined based on network information received from the unicast network 308 and/or HTTP server 314, such as a current bandwidth estimate, an explicit indication of a minimum guaranteed bit rate for delivering the segments (e.g., a guaranteed bit rate indication), and/or an explicit indication of a maximum instantaneous bit rate available for delivering segments. Response settings, such as access speed restrictions, stored in a memory of the gateway 306, may indicate a policy rule that prevents requests for representations above a quality threshold based on the current access speed, and the HTTP proxy 310 may apply the policy rule based on the determined current access speed to prevent requests for representations above 512 kb/s from being sent to the HTTP server 314. Upon receiving an HTTP Get( ) request for a 256 kb/s representation for a next segment from the DASH client running on receiver device 301, the HTTP proxy 310 may determine the 256 kb/s representation does not violate the policy rule based on the current access speed, retrieve the 256 kb/s representation for the next segment from the HTTP server 314 and provide the 256 kb/s representation for the next segment to the DASH client running on receiver device 301. Upon receiving the HTTP Get( ) request for a 1024 kb/s representation for a next segment from the DASH client running on the receiver device 303, the HTTP proxy may determine the 1024 kb/s violated the policy rule based on the current access speed, and generate an HTTP 300 redirect message indicating alternate resource IDs (e.g., URLs) for the 512 kb/s representation, the 256 kb/s representation, and the 128 kb/s representation of the requested next segment. The DASH client may receive the HTTP 300 redirect message and select the alternate resource ID of the 512 kb/s representation from the alternate resource IDs of the 512 kb/s representation, the 256 kb/s representation, and the 128 kb/s representation based on other information, such as a DASH client setting indicating a preference for higher kb/s representations. In response to selecting the alternate resource ID for the 512 kb/s representation, the DASH client may send a new HTTP Get( ) request for the 512 kb/s representation to the gateway 306. The gateway 306 may receive the new HTTP Get( ) request for the 512 kb/s representation, the HTTP proxy 310 may determine the request for the 512 kb/s representation is allowed based on the policy rule and the current access speed supporting 512 kb/s or slower reception, and the gateway 306 may provide the 512 kb/s representation of the next segment to the DASH client which may render the received 512 kb/s representation of the next segment.

In another embodiment, the HTTP proxy 310 of the gateway 306 may mediate content resource access of the HTTP clients 303, 304 running on the receiver devices 301, 302 by delivering contents to the HTTP clients 303, 304 according to the available link speed between the gateway 306 and the HTTP server 314. As an example, the HTTP clients 303, 304 may be DASH clients, both rendering media available from the HTTP server 314 having segments available in a 1024 kb/s representation, a 512 kb/s representation, a 256 kb/s representation, and a 128 kb/s representation. The HTTP proxy 310 of the gateway 306 may determine the current access speed available to retrieve segments from the HTTP server 314. The current access speed may be determined based on network information received from the unicast network 308 and/or HTTP server 314, such as a current bandwidth estimate, an explicit indication of a minimum guaranteed bit rate for delivering segments, and/or an explicit indication of a maximum instantaneous bit rate available for delivering the segments. The HTTP proxy 310 may generate and send an HTTP 300 redirect message to the HTTP clients 303, 304 containing alternate resource IDs (e.g., URLs), the network access speed information and other information the HTTP proxy had previously received in the HTTP redirection message from the HTTP server 314, such as preference information for selecting among the alternative resources. The alternate resource IDs may refer to the 1024 kb/s representation, the 512 kb/s representation, the 256 kb/s representation, and the 128 kb/s representation of the requested next segment. Each HTTP client may use the network access speed information and the selection preference information, in conjunction with other information it may already possess, to select the resource in a redirected request. In the example in which the HTTP clients 303, 304 are DASH clients and the relative access speed information is included in the 300 redirect message, each DASH client may use the MPD's minBandwidth and maxBandwidth parameters (which describe the minimum encoded data rate and maximum encoded data rate, respectively for a given representation) to select among the alternative representations for the new request.

In yet another embodiment, the HTTP proxy 310 of the gateway 306 may support content resource access of the HTTP clients 303, 304 running on the receiver devices 301, 302 by acting as a proxy cache server. As resources are provided from the gateway 306 to the receiver devices 301, 302, copies of the resources may be stored in a memory of (or accessible to) the gateway 306. The HTTP proxy may screen requests for resources from the receiver devices 301, 302 against media segment copies stored in the memory of the gateway 306, and when copies of the requested resources are present in the memory of the gateway 306, the HTTP proxy 310 may deliver stored copies of the requested resources to the HTTP clients 303, 304 of the receiver devices 301, 302 from the memory of the gateway 306.

Figure 4:
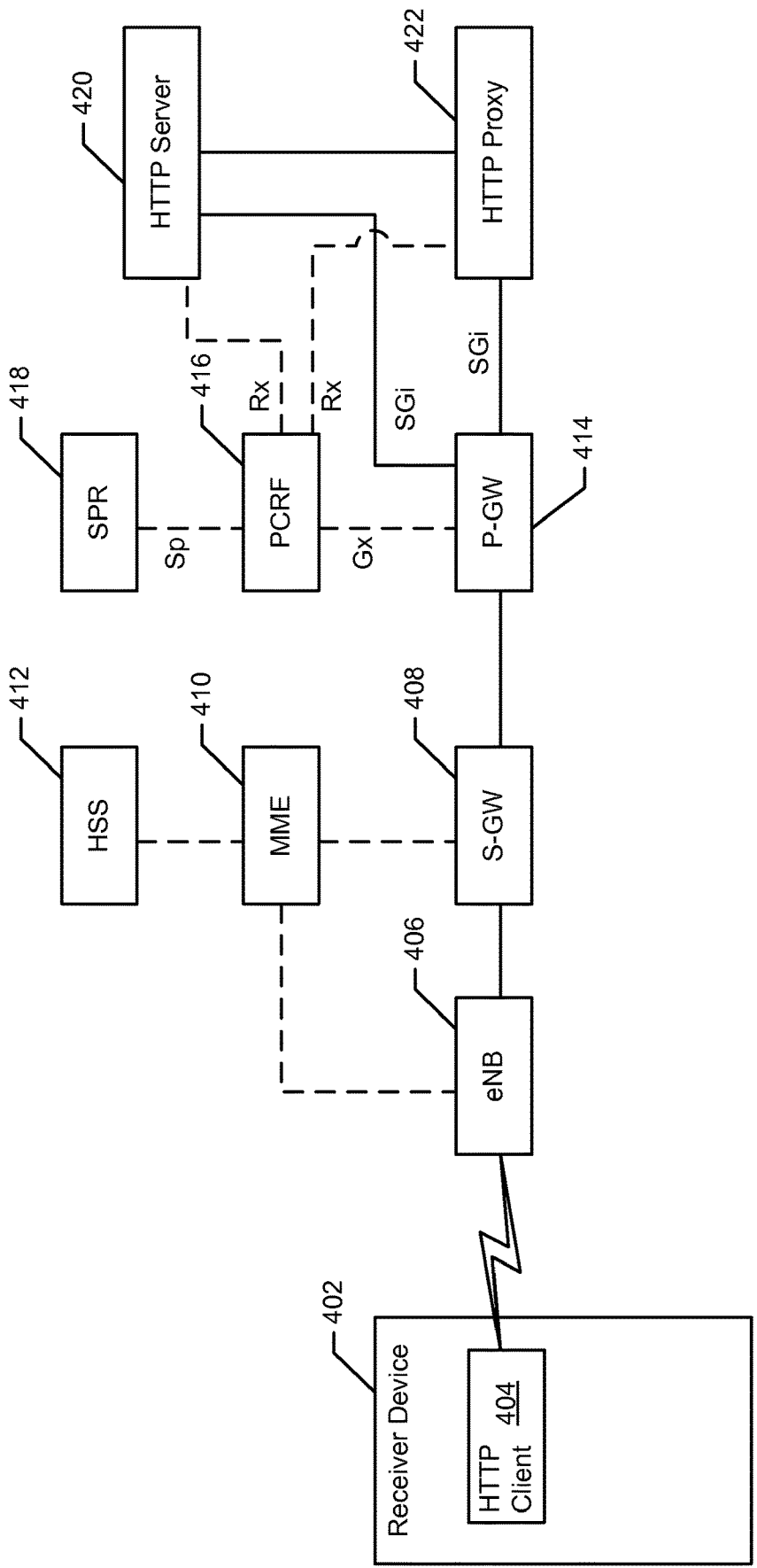
FIG. 4 is a block diagram illustrating a receiver device and network architecture according to a third embodiment.

FIG. 4 illustrates a system architecture of a receiver device 402 in communication with a network according an embodiment. As an example, the network may be a LTE network providing unicast services to the receiver device 402 via a P-GW server 414. The receiver device 402 may establish a connection with an evolve Node B ("eNB") 406, which may be connected to a serving gateway ("S-GW") server 408, which may be connected to the P-GW server 414. The P-GW server 414 may be connected via a SGi reference to an HTTP server 420 hosting resources and may exchange data with the HTTP server 420. The P-GW server 414 may be connected via another SGi reference to an HTTP proxy server 422 and may exchange data with the HTTP proxy server 422. The HTTP proxy server 422 may be connected to the HTTP server 420 and exchange data with the HTTP server 420. The S-GW server 408 and eNB 406 may send and/or receive data to/from a mobility management entity ("MME") 410. The MME 410 may send and/or receive data to/from a home subscriber server ("HSS") 412.

In an embodiment, a PCRF server 416 may send and/or receive data to/from the P-GW server 414 (e.g., via a Gx interface), the HTTP server 420 (e.g., via a Rx interface) and/or the HTTP proxy 422 (e.g., via a Rx interface). The PCRF server 416 may send and/or receive data to/from a subscriber profile registry ("SPR") 418 (e.g., via a Sp interface).

In an embodiment, HTTP requests for resources hosted at the HTTP server 420 may be routed from the P-GW server 414 to the HTTP server 420 without passing through the HTTP Proxy Server 422. In another embodiment, HTTP requests for resources hosted at the HTTP server 420 may be routed from the P-GW server 414 through the HTTP Proxy Server 422 and on to the HTTP server 420. In an embodiment, the P-GW server 414 may not directly interface with the HTTP server 420, but rather may interface with the HTTP server 420 only through the HTTP proxy server 422.

In an embodiment, the PCRF server 416 may operate as a redirect controller sending information to the HTTP server 420, such as network congestion event indications, to control content access via the network to one or more resource hosted by the HTTP server 420. Additionally, the PCRF server 416 may send response setting updates to the HTTP server 420 to control operations of the HTTP server 420 to generate redirects including one or more alternative resource IDs and access policy information. In a further embodiment, the PCRF server 416 may send network information to the HTTP proxy server 422. In an embodiment, the PCRF server 416 may also send network information to the HTTP client 404 of the receiver device 402.

In an embodiment, the PCRF server 416 may send policy rules updates to the HTTP proxy server 422 and/or HTTP client 404 to update redirect handling rules available to the HTTP proxy server 422 and/or HTTP client 404. The redirect handling rules may control the operations of the HTTP proxy server 422 and/or HTTP client 404 in response to receiving HTTP redirect messages.

As an example, the HTTP proxy server 422 may be configured to mediate access to resources when network congest occurs based on a user class associated with the requesting receiver device 402. A redirect handling rule stored in a memory available to the HTTP proxy server 422 may indicate that during a network congestion event receiver devices identified as basic subscribers are to be downgraded to lower quality/lower bit rate representations in response to requests for high quality/bit rate representations while receiver devices identified as premium subscribers may receive requested high quality/bit rate representations. The HTTP server 420 may host 512 kb/s representations, 256 kb/s representations, and 128 kb/s representations of resources (e.g., DASH segments), and the redirect handling rule may control the HTTP proxy server 422 to take action (e.g., send HTTP 3xx series redirect messages to the HTTP client 404 and subsequently pass redirected HTTP requests from the HTTP client 404 to the HTTP server 420) to respond with the requested representation of the resource based on the user subscription type. The PCRF server 416 may detect network congestion and send an indication of a network congestion event to the HTTP proxy server 422. During the network congestion event, a receiver device 402 may send an HTTP Get( ) request for a high quality/bit rate 512 kb/s representation of a next segment. The HTTP proxy server 422 may receive the HTTP Get( ) request from the P-GW server 414.

The HTTP proxy server 422 may also receive information from the PCRF server 416 indicating the subscription type of the receiver device 402 sending the HTTP Get( ) request. If the subscription type of the receiver device 402 identifies the receiver device 402 as a premium subscriber, the HTTP Get( ) request for the high quality/bit rate 512 kb/s representation of the next segment may be passed from the HTTP proxy server 422 to the HTTP server 420, and the requested high quality/bit rate 512 kb/s representation of the next segment may be provided from the HTTP server 420 to the receiver device 402 for rendering by the HTTP client 404. If the subscription type of the receiver device 402 identifies the receiver device 402 as a basic subscriber, the HTTP Get( ) request for the high quality/bit rate 512 kb/s representation of the next segment may be downgraded by generating an HTTP 300 redirect message at the HTTP proxy server 422 including the alternative resource IDs (e.g., URLs) of the 256 kb/s representations, and 128 kb/s representations of the next segment.

The HTTP 300 redirect message may be sent from the HTTP proxy server 422 to the HTTP client 404 of the receiver device 402. The HTTP client 404 of the receiver device 402 may select an alternative resource ID of the lower quality/bit rate 256 kb/s representation of the next segment and send an HTTP Get( ) request for the lower quality/bit rate 256 kb/s representation of the next segment. This HTTP Get( ) request may be received by the HTTP proxy server 422 and may not be downgraded because the lower quality/bit rate request may be allowed by the response settings of the HTTP proxy server 422 for basic subscribers. The HTTP proxy server 422 may pass the HTTP Get( ) request for the lower quality/bit rate 256 kb/s representation of the next segment to the HTTP server 420. The lower quality/bit rate 256 kb/s representation of the next segment may be provided from the HTTP server 420 to the receiver device 402 for rendering by the HTTP client 404.

In an embodiment, in response to selecting the lower quality/bit rate 256 kb/s representation of the next segment, the HTTP client 404 may update a media availability document (e.g., an MPD) to indicate that the 512 kb/s representations of the media stream are unavailable. In this manner, the HTTP client 404 may prevent future requests for unavailable representations, thereby preventing repetitive redirects from being continually generated.

Figure 5:
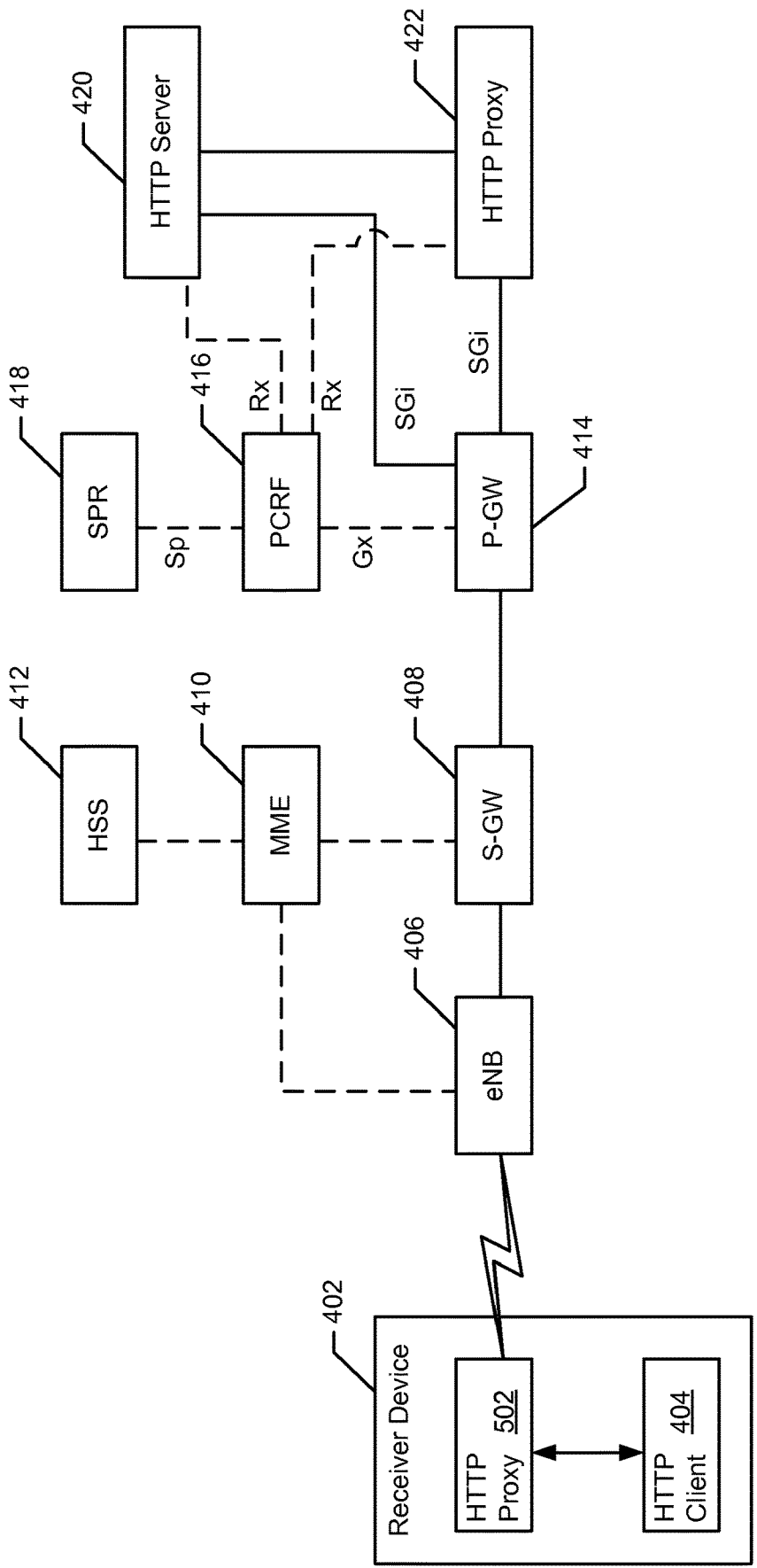
FIG. 5 is a block diagram illustrating a receiver device and network architecture according to fourth embodiment.

FIG. 5 illustrates an embodiment system architecture similar to that illustrated in FIG. 4 described above, except that in the system architecture illustrated in FIG. 5 the receiver device 402 may also include a local HTTP proxy 502. In an embodiment, the HTTP proxy 502 may be a standalone server module running on the processor of the receiver device 402 independent of the HTTP client 404. The HTTP client 404 may route HTTP requests to the network through the HTTP proxy 502, and HTTP responses and redirects from the network may pass through the HTTP proxy 502 to the HTTP client 404. The HTTP proxy 502 may be configured to receive HTTP redirect messages including alternative resource IDs and filter the alternative resource IDs to generate new HTTP redirect messages to be passed to the HTTP client 404. In an embodiment, the HTTP proxy 502 in conjunction with the network side HTTP proxy server 422 may operate as a policy execution function to mediate HTTP client 404 access to content.

As an example, at the onset of potential network congestion, time and location policy information as well as priority and cost parameters (e.g. a priority indication and/or cost indication) associated with alternate resources may be sent from the PCRF server 416 to the HTTP proxy server 422. The HTTP server 420 may host the 1024 kb/s representation, 512 kb/s representation, the 256 kb/s representation, and the 128 kb/s representation whose constituent DASH segments may be accessed by the HTTP client 404 (e.g., a DASH client) to render a media presentation. The HTTP client 404, such as a DASH client, may send an HTTP Get( ) request via the HTTP proxy 502, eNB 406, S-GW server 408, and P-GW server 414 to the HTTP proxy server 422 requesting the highest quality 1024 kb/s representation of a next segment (e.g., DASH segment). Based on network policy rules in the response settings available to the HTTP proxy server 422, the HTTP proxy server 422 may determine the 1024 kb/s representation of the next segment may not be provided to the requesting HTTP client 404. In response, the HTTP proxy server 422 may generate an HTTP 300 redirect message with an entity body including the alternate resource IDs associated with the 512 kb/s representation, 256 kb/s representation, and 128 kb/s representation of the requested next segment, as well as access policy information such as time policy rules, location policy rules (e.g., a location rule), priority parameters, access speed information, cost parameters, and/or other metadata associated with each alternative resource. The HTTP proxy server 422 may send the HTTP 300 redirect message to the HTTP proxy 502 of the receiver device 402. The HTTP proxy 502 may filter the alternate resource IDs in the HTTP redirect message based on the access policy information, such as the time policy rules, location policy rules, priority parameters, cost parameters, and/or other metadata, as well as response settings and/or other information available to the HTTP proxy 502 (e.g., the HTTP proxy 502 may apply a user setting to not use alternate resources associated with a cost and the current location of the receiver device 402 to eliminate alternate resource IDs not meeting those criteria). The HTTP proxy 502 may generate a new HTTP 300 redirect message with one or more selected alternate resource ID (e.g., the 256 kb/s representation and 128 kb/s representation alternate resource IDs) and the selected alternate resource IDs' associated access policy information, and send the new HTTP 300 redirect message to the HTTP client 404. The HTTP client 404 (e.g., the DASH Client) may use the associated access policy information in the HTTP 300 redirect message to select one of the alternate resource IDs (e.g., the 128 kb/s representation's associated alternate resource ID based on it having the highest indicated priority for download and/or the 128 kb/s representation based on a result of an internal algorithm used by the HTTP client 404 indicating that the 128 kb/s representation is best matched to the available access speed based on the access speed information and a maxBandiwdth indicated in the MPD), and send an HTTP Get( ) request for the 128 kb/s representation of the next segment. The HTTP proxy server 422 may receive the HTTP Get( ) request for the 128 kb/s representation of the next segment, determine the HTTP Get( ) request for the 128 kb/s representation of the next segment does not violate the current response settings (e.g., network policy), and retrieve the 128 kb/s representation of the next segment from the HTTP server 420 and send an HTTP response (e.g., HTTP 200 OK response) to the HTTP client 404 with the requested 128 kb/s representation of the next segment. The HTTP client 404 may receive the requested 128 kb/s representation of the next segment via the HTTP proxy 502 and render (e.g., play out) the requested 128 kb/s representation of the next segment.

Figure 6:
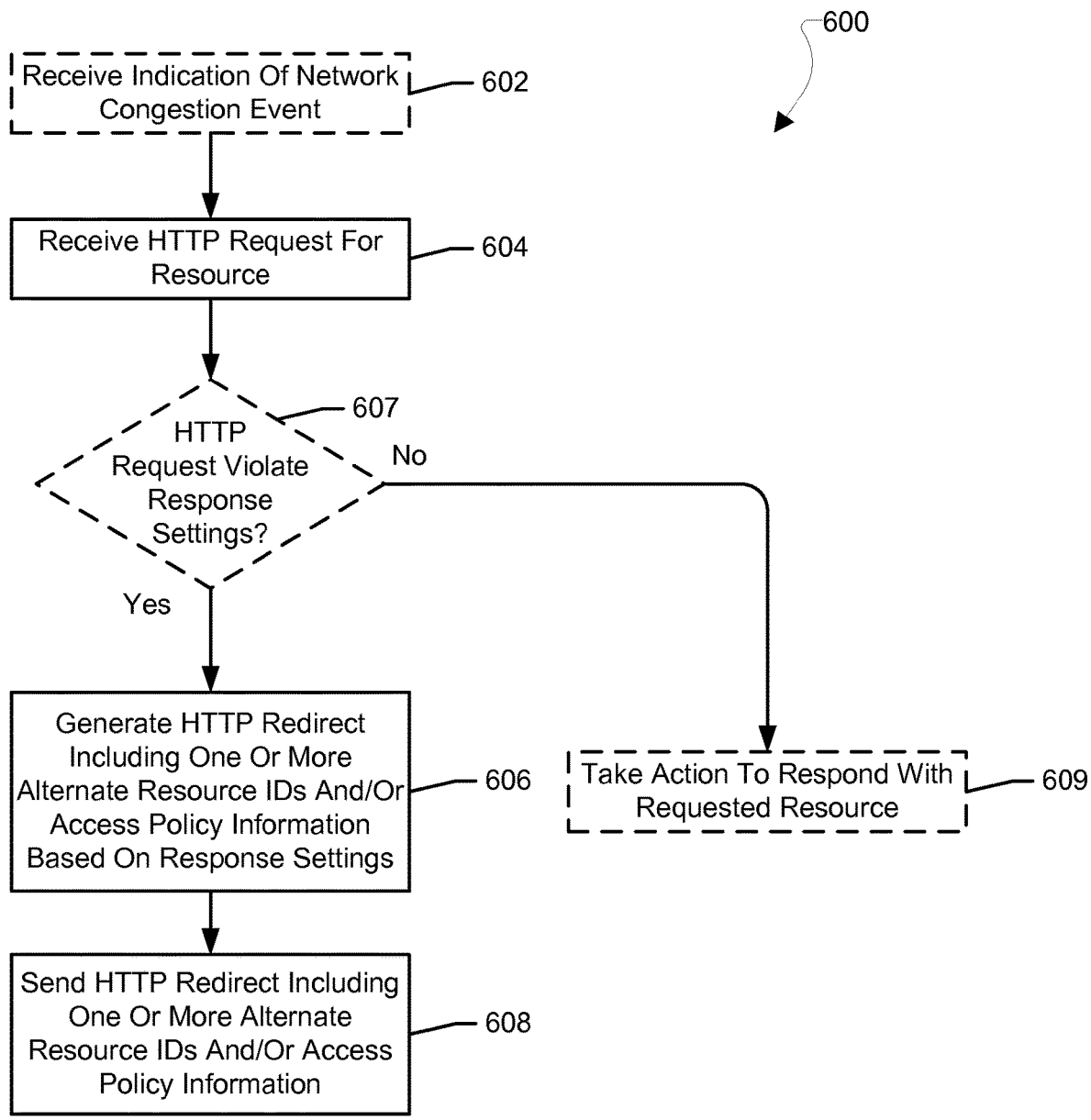
FIG. 6 is a process flow diagram illustrating an embodiment method for generating HTTP redirect messages.

FIG. 6 illustrates an embodiment method 600 for generating HTTP redirect messages that may be performed by an HTTP proxy (e.g., an HTTP proxy module running on a processor of a receiver device, a network side HTTP proxy server, and/or an HTTP proxy of a gateway device) or an HTTP server. In an optional embodiment, in optional block 602 the HTTP proxy or HTTP server may receive an indication of a network congestion event. An indication of a network congestion event may be a message received from a network element, such as a PCRF server, indicating that network congestion is occurring and/or is anticipated. In an embodiment, the indication of the network congestion event indication may include network congestion information, quality of service information, location information (e.g., applicable service areas and/or cells), available access speed information, cost information, and/or subscriber information. In an embodiment, the network information included in the indication of the network congestion event may modify response settings available to the HTTP proxy or HTTP server.

In block 604 the HTTP proxy or HTTP server may receive an HTTP request for a resource. As an example, the HTTP request may be an HTTP Get( ) request for a representation (e.g., version) of a DASH media presentation.

In an optional embodiment, in optional determination block 607 the HTTP proxy or HTTP server may determine whether the HTTP request violates one or more response settings. As an example, the HTTP proxy or HTTP server may compare information associated with the HTTP request (e.g., type or resource requested, size of resource requested, subscriber level of receiver device sending the HTTP request, etc.) to a response settings table stored in a memory available to the HTTP proxy or HTTP server to identify if the information associated with the HTTP request does not meet thresholds in the response settings table.

In response to determining that the HTTP request does not violate any response settings (i.e., determination block 607="Yes"), the HTTP proxy or HTTP server may take an action to respond with the requested resource in block 609. As an example, an HTTP proxy may pass the HTTP request to an HTTP server hosting the resource. As another example, an HTTP server may respond to the HTTP request with the requested resource.

In response to determining that the HTTP request does violate a response setting (i.e., determination block 607="Yes") or the HTTP proxy or HTTP server may generate an HTTP redirect message including one or more alternate resource IDs and/or access policy information based on the response settings in block 606. As an example, the HTTP proxy or HTTP server may generate an HTTP 303 redirect message indicating an alternate resource ID (e.g., URI) of another version of the requested resource. As another example, the HTTP proxy or HTTP server may generate an HTTP 300 redirect message with an entity body including alternate resource IDs and network information including access policy information such as priority information, validity time information, location information, a default redirect URL, guaranteed bit rate information, maximum bit rate information (e.g., a maximum bit rate indication), cost information, an MPD update information, and/or other information.

In block 608 the HTTP proxy or HTTP server may send the HTTP redirect message including the one or more alternate resource ID and/or access policy information. As an example, the HTTP proxy or HTTP server may send the HTTP redirect message to another HTTP proxy. As another example, the HTTP proxy or HTTP server may send the HTTP redirect message to an HTTP client (e.g., DASH client) that sent the original request.

Figure 7:
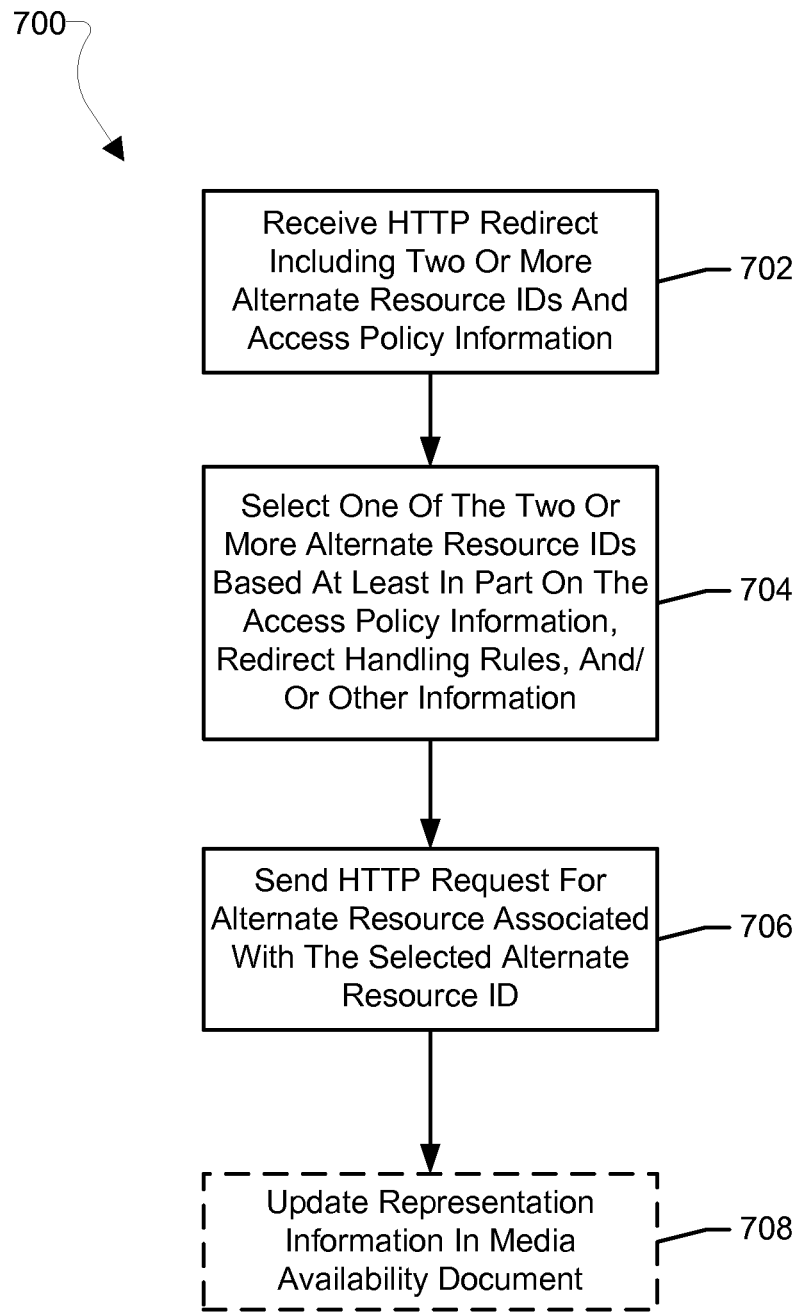
FIG. 7 is a process flow diagram illustrating an embodiment method for sending an HTTP request for an alternate resource.

FIG. 7 illustrates an embodiment method 700 for sending a redirected HTTP request for an alternate resource. In an embodiment, the operations of method 700 may be performed by an HTTP client running on a processor of a receiver device, such as a DASH client. In block 702 the HTTP client may receive an HTTP redirect message including two or more alternate resource IDs and access policy information. As an example, the HTTP redirect message may be an HTTP 300 redirect message including alternate resource IDs and associated access policy information, such as priority information, validity time information, location information, a default redirect URL, guaranteed bit rate information, maximum bit rate information, cost information, an MPD update information, and/or other information.

In block 704 the HTTP client may select one of the two or more alternate resource IDs based at least in part on the access policy information, redirect handling rules, and/or other information available the HTTP client. As an example, access policy information may indicate a validity duration, start and stop time for each alternative resource ID, and based on the current clock time of the receiver device the HTTP client may select an alternate resource ID that is currently valid.

In block 706 the HTTP client may send an HTTP request for the alternate resource associated with the selected alternate resource ID. As an example, the HTTP client may send an HTTP Get( ) indicating the URI of the alternate resource associated with a selected alternate resource ID to an HTTP proxy and/or HTTP server.

In an optional embodiment, the HTTP client may update representation information in a media availability document (e.g., an MPD) in response to sending the HTTP request for an alternative resource in optional block 708. For example, the HTTP client may update an MPD to reflect that an originally requested representation is unavailable. As another example, the HTTP client may update an MPD to reflect that an alternative resource should be selected without waiting for future redirects. In this manner, the HTTP client may map the MPD to the alternative resources and may avoid receiving future redirects.

Figure 8A:
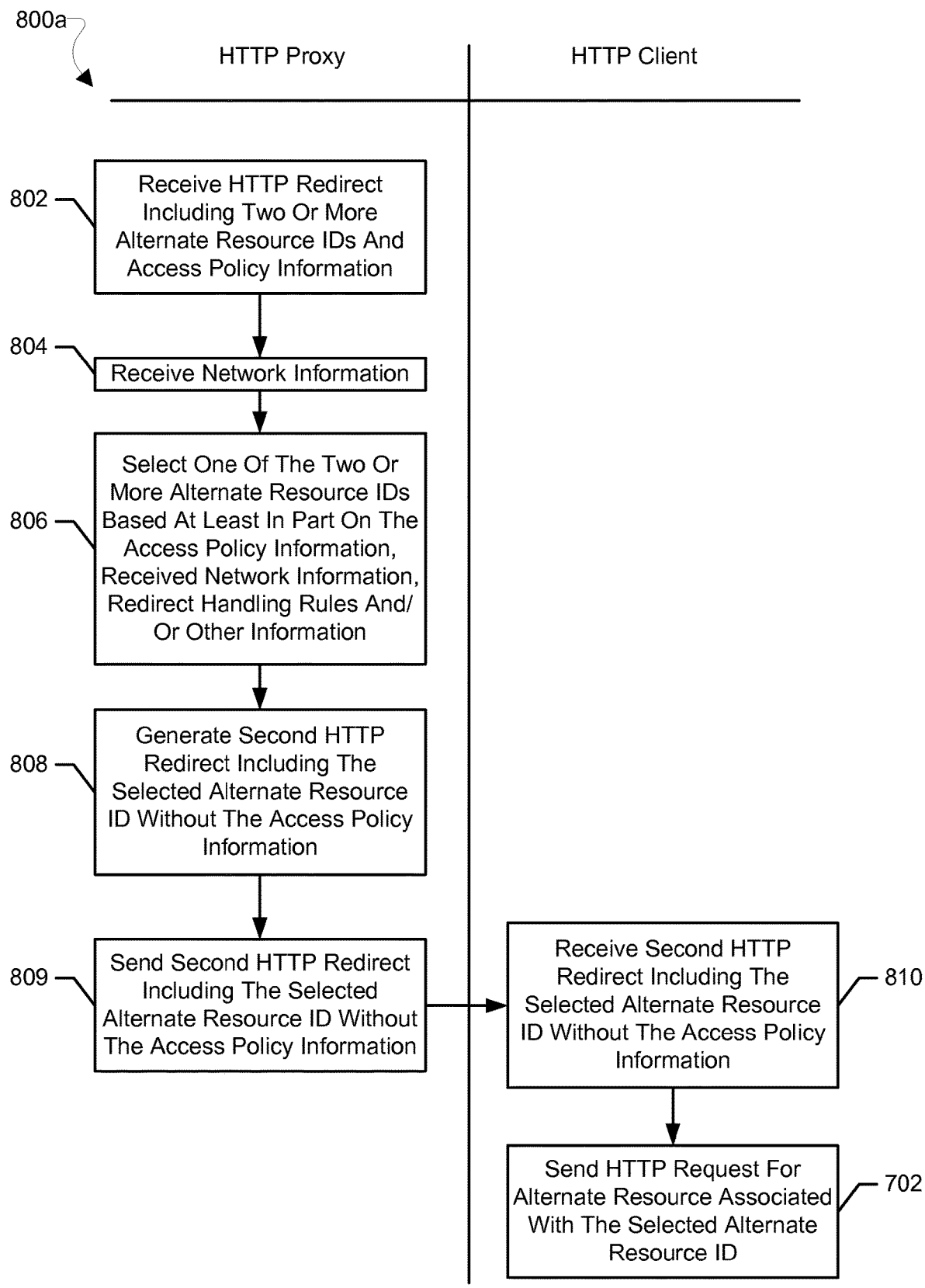
FIG. 8A is a process flow diagram illustrating an embodiment method for generating an HTTP redirect message at an HTTP proxy including a selected alternate resource ID without access policy information.

FIG. 8A illustrates an embodiment method 800a for generating an HTTP redirect message at an HTTP proxy including a selected alternate resource ID without access policy information. In an embodiment, the operations of method 800a may be performed by an HTTP proxy (e.g., an HTTP proxy module running on a processor of a receiver device, a network side HTTP proxy server, and/or an HTTP proxy of a gateway device) in communication with an HTTP client running on the processor of the receiver device, such as a DASH client.

In block 802 the HTTP proxy may receive an HTTP redirect message including two or more alternate resource IDs and access policy information. As an example, the HTTP redirect message including two or more alternate resource IDs and access policy information may be an HTTP 300 redirect message including two or more alternate resource IDs and access policy information, such as priority information, validity time information, location information, a default redirect URL, guaranteed bit rate information, maximum bit rate information, cost information, an MPD update information, and/or other information, sent from another HTTP proxy and/or an HTTP server.

In block 804 the HTTP proxy may receive network information. As examples, network information may be network congestion information, quality of service information, location information, cost information, subscriber information, user settings, etc.

In block 806 the HTTP proxy may select one of the two or more alternate resource IDs based at least in part on the access policy information, received network information, redirect handling rules, and/or other information available to the HTTP proxy. As an example, the HTTP proxy may apply a redirect handling rule indicating that a highest possible quality version is to be selected and select the highest possible quality version that is available in the current service area as indicated by the service area indications in the access policy information.

In block 808 the HTTP proxy may generate a second HTTP redirect message including the selected alternative resource ID without the access policy information. As an example, the HTTP proxy may generate an HTTP 303 redirect message including the alternate resource ID (e.g., URI) in the location header.

In block 809 the HTTP proxy may send the second HTTP request including the selected alternate resource ID without the access policy information, and in block 810 the HTTP client may receive the second HTTP request including the selected alternate resource ID without the access policy information. As discussed above with reference to FIG. 7, in block 702 the HTTP client may send an HTTP request for the alternative resource associated with the selected alternate resource ID.

Figure 8B:
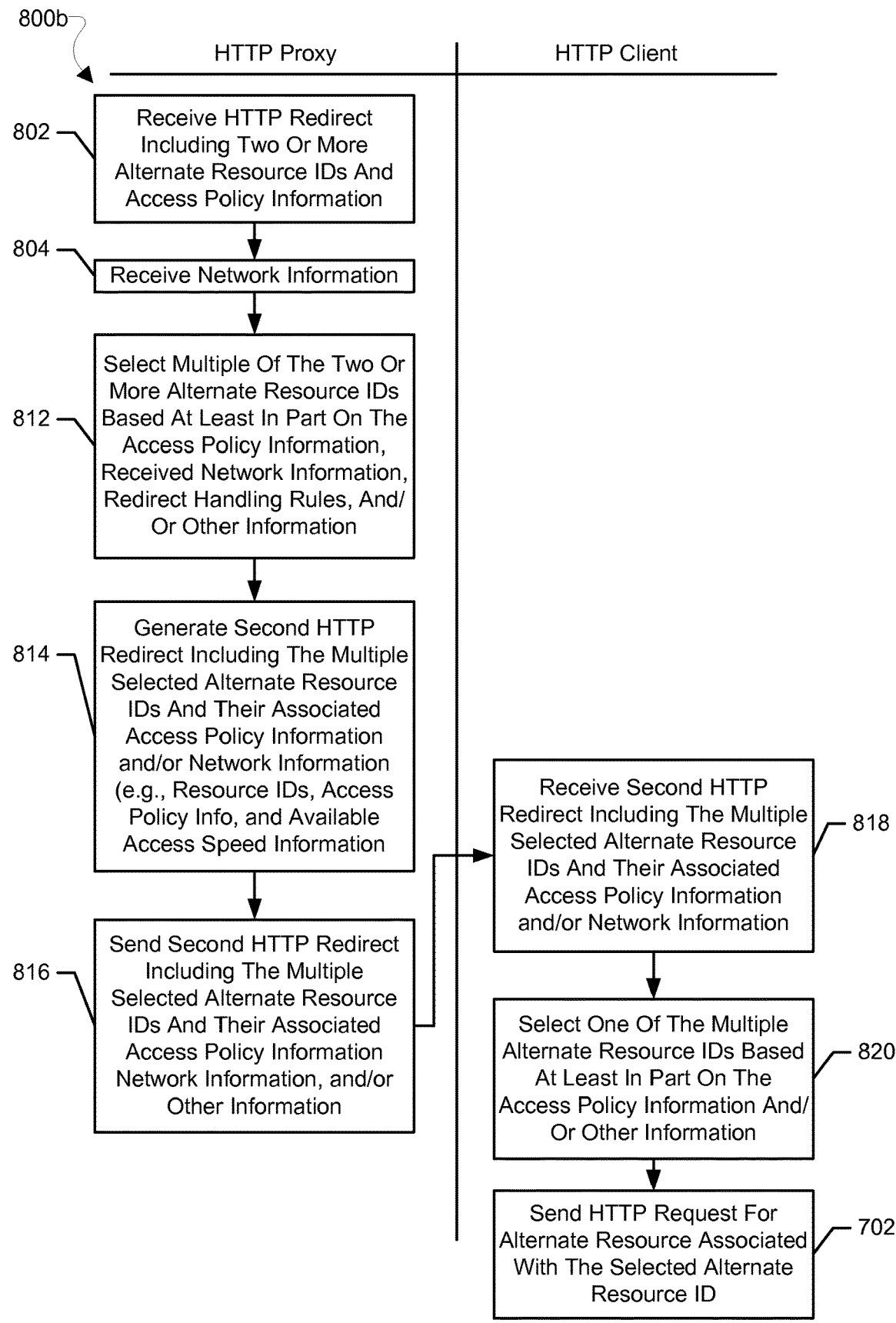
FIG. 8B is a process flow diagram illustrating an embodiment method for generating an HTTP redirect message at an HTTP proxy including multiple selected alternate resource IDs and associated access policy information.

FIG. 8B illustrates an embodiment method 800b that is similar to method 800a described above with reference to FIG. 8A, except that in method 800b a second HTTP request including multiple selected alternate resources may be sent from the HTTP proxy to the HTTP client. In an embodiment, the operations of method 800b may be performed by an HTTP proxy (e.g., an HTTP proxy module running on a processor of a receiver device, a network side HTTP proxy server, and/or an HTTP proxy of a gateway device) in communication with an HTTP client running on the processor of the receiver device, such as a DASH client.

In blocks 802 and 804 the HTTP proxy may perform operations of like numbered block of method 800a described above with reference to FIG. 8A. In block 812 the HTTP proxy may select multiple of the two or more alternate resource IDs based at least in part on the access policy information, received network information, redirect handling rules, and/or other information. As an example, the HTTP proxy may apply a redirect handling rule indicating that no resources above a certain size may be made available to HTTP clients, and the HTTP proxy may eliminate those alternate resource IDs whose access policy information indicates the alternate resource exceeds the size limit.

In block 814 the HTTP proxy may generate a second HTTP redirect message including the multiple selected alternative resource IDs and their associated access policy information and/or network information. As an example, the HTTP proxy may generate an HTTP 300 redirect message including the selected alternate resource IDs, access policy information and/or network information in the entity body.

In block 816 the HTTP proxy may send the second HTTP request including the multiple selected alternate resource IDs and their associated access policy information and/or network information, and in block 818 the HTTP client may receive the second HTTP redirect including the multiple selected alternate resource IDs and their associated access policy information and/or network information.

In block 820 the HTTP client may select one of the multiple alternate resource IDs based at least in part on the access policy information, and/or network information, and/or other information. As an example, the HTTP client may select an alternative resource ID having the highest quality, available in the current physical cell, and having no cost associated with it. As discussed above with reference to FIG. 7, in block 702 the HTTP client may send an HTTP request for the alternative resource associated with the selected alternate resource ID.

Figure 9:
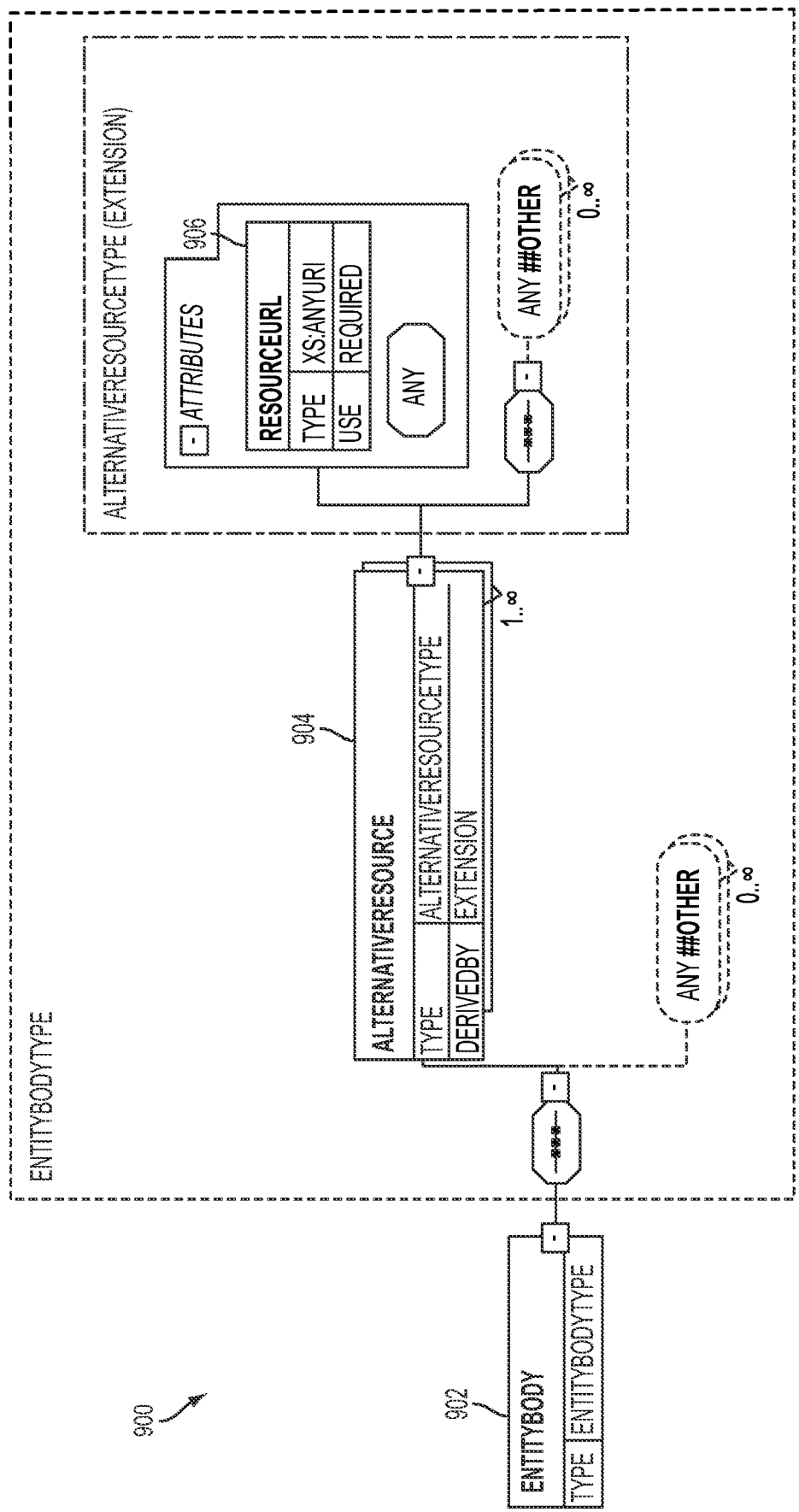
FIG. 9 is a data schema diagram illustrating a structure of the body of an embodiment HTTP redirect message.

FIG. 9 is an example XML schema 900 illustrating a data structure of the entity body 902 of an embodiment HTTP 300 redirect message. The entity body 902 may include one or more alternate resource IDs 904 each associated with a resource URL 906.

Figure 10:
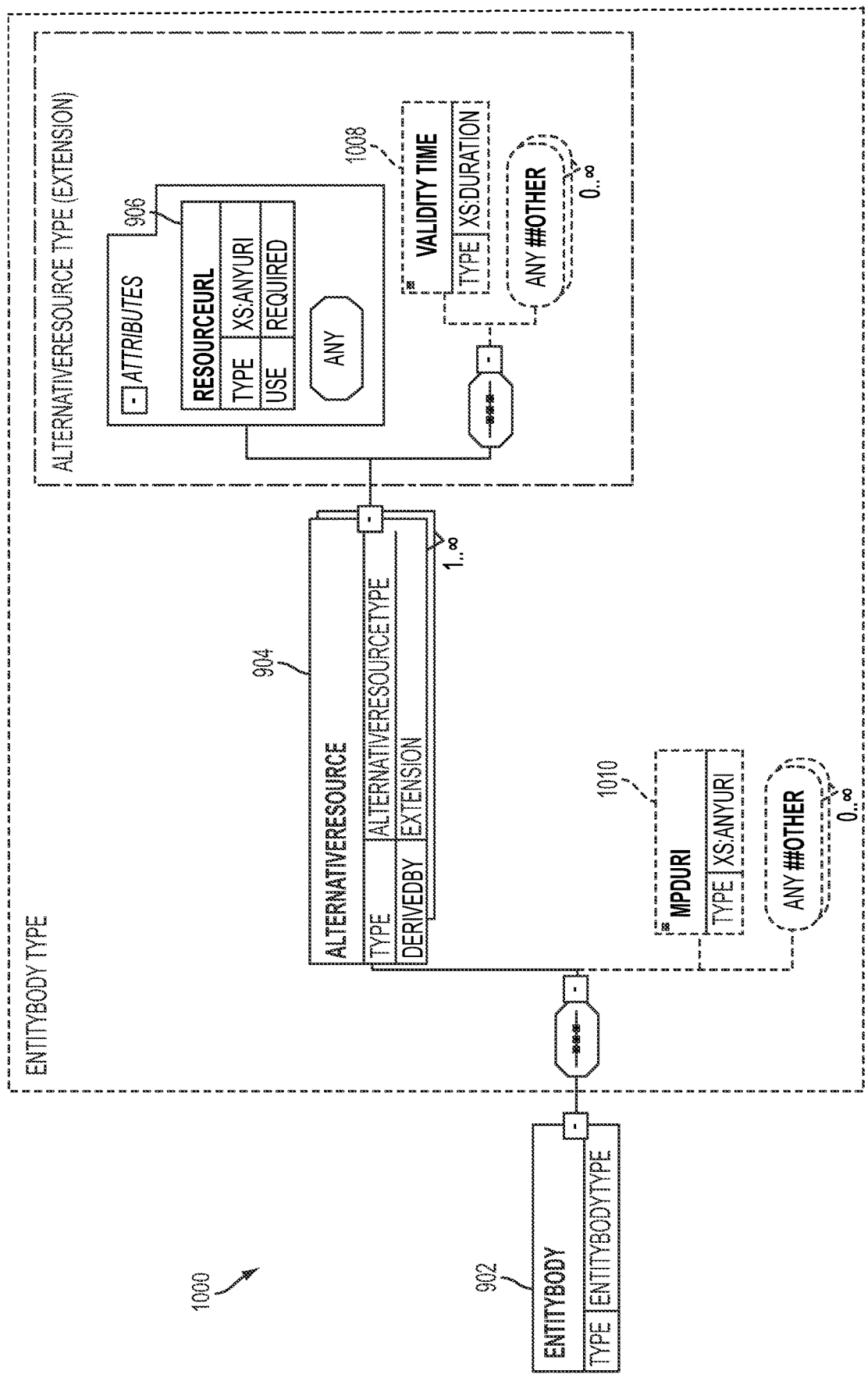
FIG. 10 is a data schema diagram illustrating a structure of the body of another embodiment HTTP redirect message.

FIG. 10 is an example XML schema 1000 illustrating a data structure of the entity body 902 of another embodiment HTTP 300 redirect message. The XML schema 1000 may be similar to XML schema 900 described above with reference to FIG. 9, except that optionally each alternative resource ID 904 may optionally be associated with a validity time indication 1008. The validity time indication 1008 may indicate a duration to the expiration in availability time of the alternative resource associated with an alternative resource ID 904. In an optional embodiment, the entity body 902 may also optionally include a MPD URI that may be a MPD update indication to notify a receiving entity (e.g., a DASH client) that an updated MPD should be requested.

Figure 11:
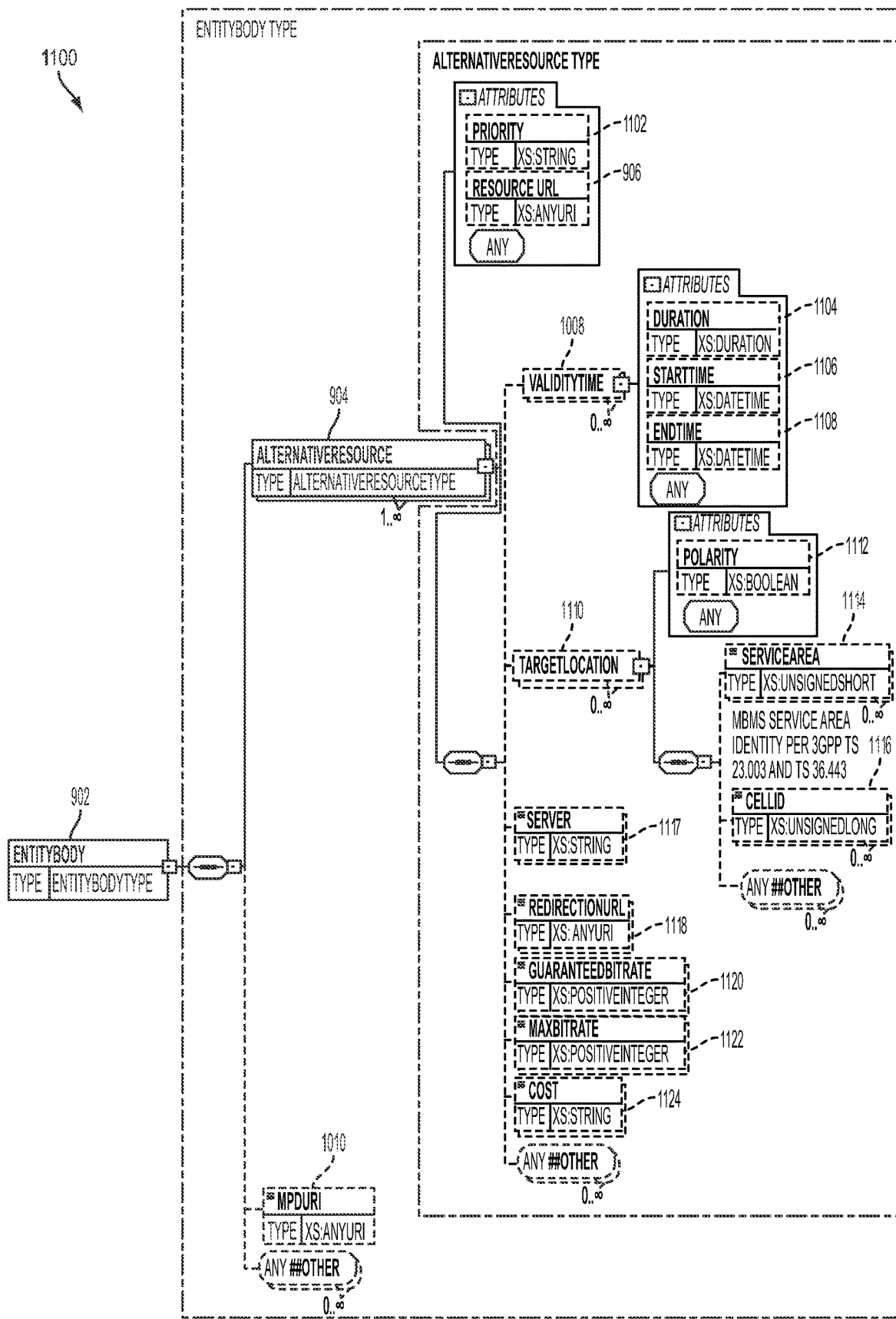
FIG. 11 is a data schema diagram illustrating a structure of the body of a third embodiment HTTP redirect message.

FIG. 11 is an example XML schema 1100 illustrating a data structure of the entity body 902 of a third embodiment HTTP 300 redirect message. The XML schema 1100 may be similar to XML schema 1000 described above with reference to FIG. 10, except that optionally each alternative resource ID 904 may optionally be associated with a priority attribute 1102, duration 1104, start time 1106, end time 1108, target location 1110, polarity 1112, service area 1114, cell ID 1116, server identifier 1117, redirect source URL 1118, guaranteed bit rate 1120, max bit rate 1122, and/or cost 1124. The priority attribute 1102 may represent a network defined preference value for selecting on representation relative to others. In an embodiment, the originally requested resource URL may be indicated as an alternative resource, but the priority associated with the originally requested resource URL may be lower priority than other resources. The priority attribute 1102 may be signaled differently to different subscribers. For example, higher level subscribers may have different priorities for the alternative resources than lower level subscribers. The duration 1104, start time 1106, and end time 1108 of the validity time indication 1008 may indicate a time interval in which the associated representation may be available. As an example, higher quality representations may not be valid at time intervals corresponding with network maintenance periods. The target location 1110 may define a required receiver device position location to be eligible to access an associated representation. The polarity 1112 may define whether the receiver device must be within or without a service area 1114 and/or cell ID 1116 to access an associated representation. The server identifier 1117 may indicate the server hosting an alternative resource. The redirect source URL 1118 may indicate a fall back URL of an alternative resource to which the HTTP client may send an HTTP request if no other alternate resource IDs associated criteria are met. In this manner, a potential redirect loop (e.g., the receiver device is not located in the target area as indicated by the target location 1110 and keeps repetitively sending requests for the original resource) may be avoided. The guaranteed bit rate 1120 may indicate a guaranteed bit rate value for content deliverable to the HTTP client for the corresponding alternative resource. The maximum bit rate 1122 may indicate a maximum bit rate value for content deliverable to the HTTP client for the corresponding alternative resource. The cost 1124 may indicate an additional monetary cost for access to the associated representation (e.g., the originally requested representation may still be available as an alternative resource, but now an additional cost may be incurred to receive that resource).

Figure 12:
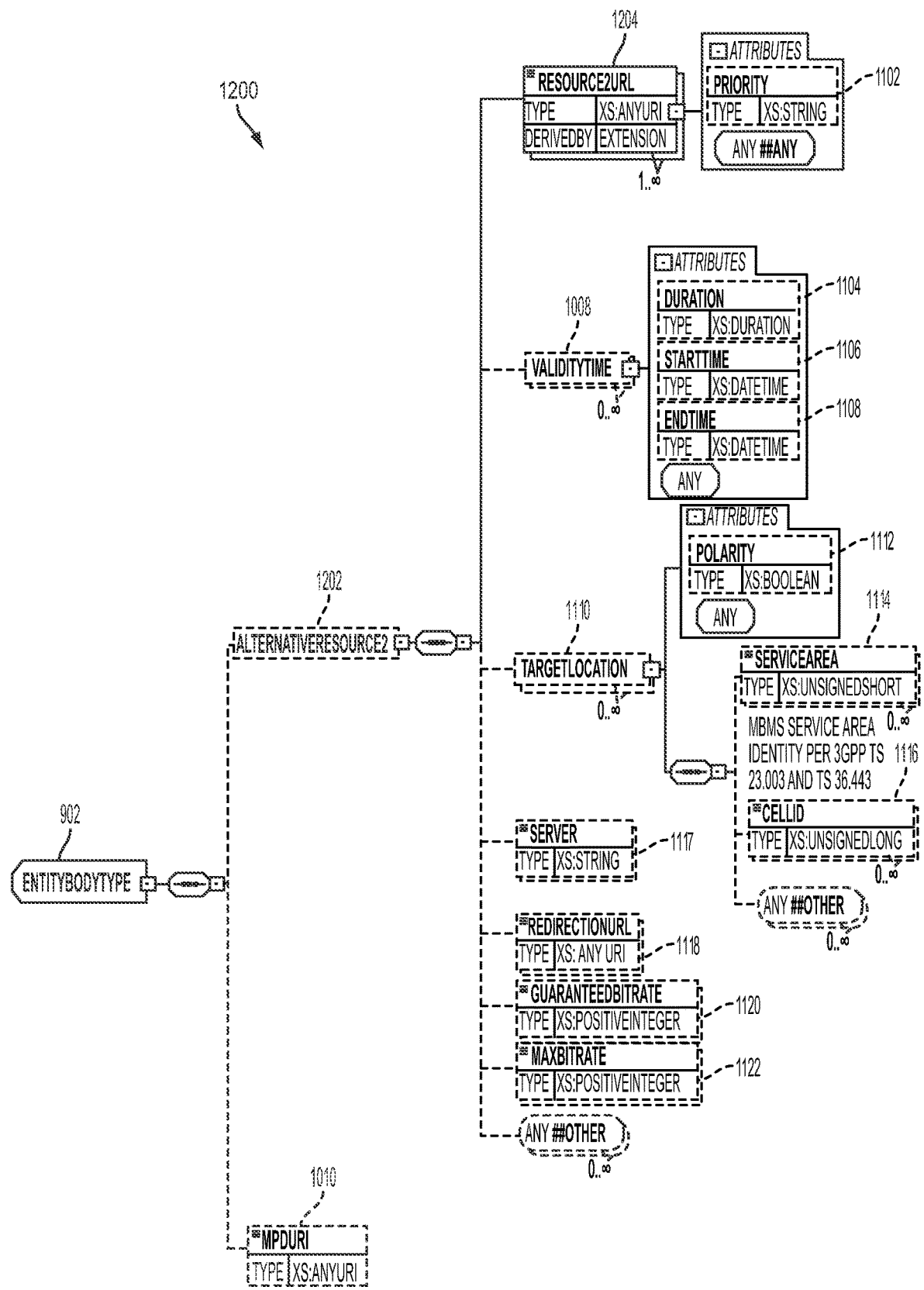
FIG. 12 is a data schema diagram illustrating a structure of the body of a fourth embodiment HTTP redirect message.

FIG. 12 is an example XML schema 1200 illustrating a data structure of the entity body 902 of fourth embodiment HTTP 300 redirect message. The XML schema 1200 may be similar to XML schema 1100 described above with reference to FIG. 11, except that the optional validity time 1008, target location 1110, server identifier 1117, redirection URL 1118, guaranteed bit rate 1120, and maximum bit rate 1122 may apply to all the alternative resource IDs 1204 indicated as an alternative resource set 1202. An alternative resource set 1202 may be identified in the entity body 902, and the alternative resource IDs 1204 (e.g., URLs) for each alternative resource may be identified.

FIG. 13 is a data structure diagram illustrating potential elements of a redirect handling rules table 1300. A redirect handling table 1300 may include redirect handling rules may govern how an HTTP proxy operates in response to an HTTP redirect message and the access policy information included in the HTTP redirect message. A redirect handling table 1300 may be stored in a memory available to an HTTP proxy. A redirect handling table 1300 may include access policy elements 1302 and 1304 correlated with behaviors 1306. As an example, validity time and target area access policy elements may be correlated with behavior to be taken by the HTTP proxy. The correlation of access policy elements 1302 and 1304 with behaviors 1306 may enable the HTTP proxy to combine policy rules and other metadata within an HTTP redirect message with other information available to the HTTP proxy to select the corresponding behavior 1306 with which to react to a receiver HTTP redirect message. For example, if start time and end time are associated with an alternative resource ID in a received HTTP redirect message, but target area is not listed in the redirect, the associated alternative resource ID may be listed in an HTTP 300 redirect message sent to the HTTP client. As another example, if duration or end time and start time are associated with an alternative resource ID in a received HTTP redirect message, as well as service area and cell ID with a polarity of zero, the associated alternative resource ID may not be listed in an HTTP 300 redirect message send to the HTTP client if the receiver device is within the service area or physical cell.

Figure 14:
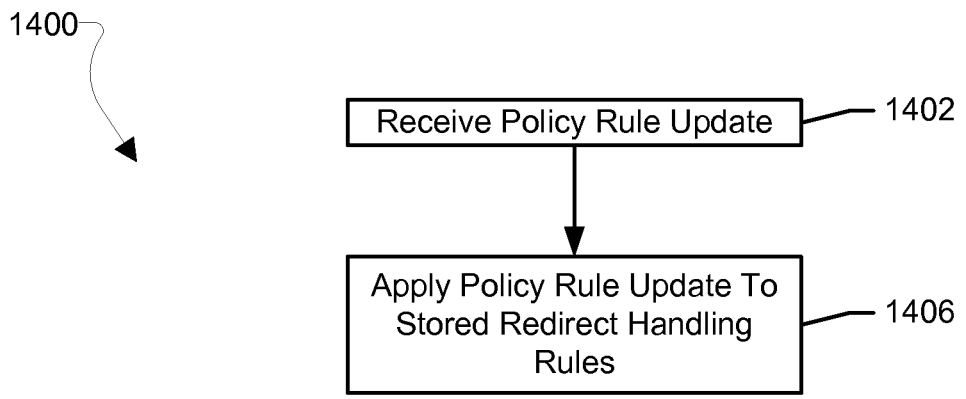
FIG. 14 is a process flow diagram illustrating an embodiment method for updating redirect handling rules.

FIG. 14 illustrates an embodiment method 1400 for updating redirect handling rules. In an embodiment, the operations of method 1400 may be performed by an HTTP proxy, such as an HTTP proxy module running on a processor of a receiver device, a network side HTTP proxy server, and/or an HTTP proxy of a gateway device. In block 1402 the HTTP proxy may receive a policy rule update. As an example, a policy rule update may be a message indicating a change in redirect handling rules sent by a network entity, such as a redirect controller (e.g., a PCRF server). In block 1406 the HTTP proxy may apply the policy rule update to the stored redirect handling rules. As an example, the HTTP proxy may update behaviors and/or access policy elements in a stored redirect handling rules table.

Figure 15:
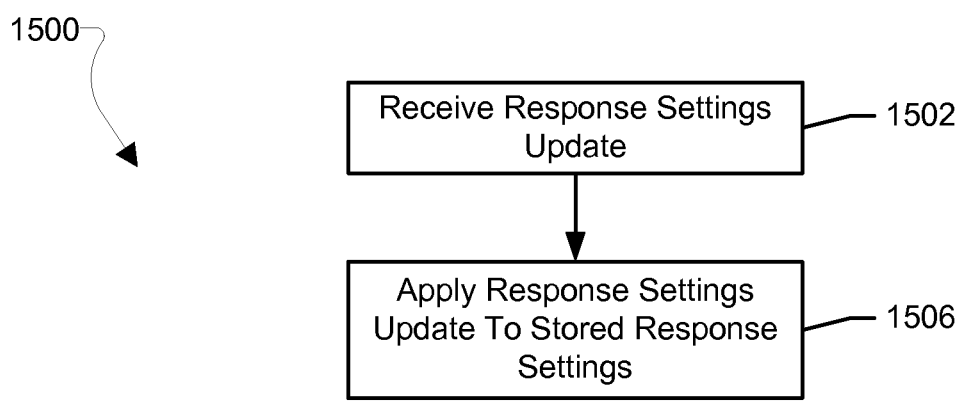
FIG. 15 is a process flow diagram illustrating an embodiment method for updating response settings.

FIG. 15 illustrates an embodiment method 1500 for updating response settings. In an embodiment, the operations of method 1500 may be performed by an HTTP proxy, such as an HTTP proxy module running on a processor of a receiver device, a network side HTTP proxy server, and/or an HTTP proxy of a gateway device, and/or an HTTP server. In block 1500 the HTTP proxy and/or HTTP server may receive response settings updates. In an embodiment, response settings updates may be changes to the settings governing how an HTTP proxy and/or HTTP server generates HTTP redirect messages and/or the access policy information included in generated HTTP redirect messages. As an example, a response settings update may be a message (e.g., a network congest event indication) indicating a change in policy rules sent by a network entity, such as a redirect controller (e.g., a PCRF server). In block 1506 the HTTP proxy and/or HTTP server may apply the response settings updates to the stored response settings. In this manner, the network may adjust how redirects are generated by the HTTP proxy and/or HTTP server.

Figure 16:
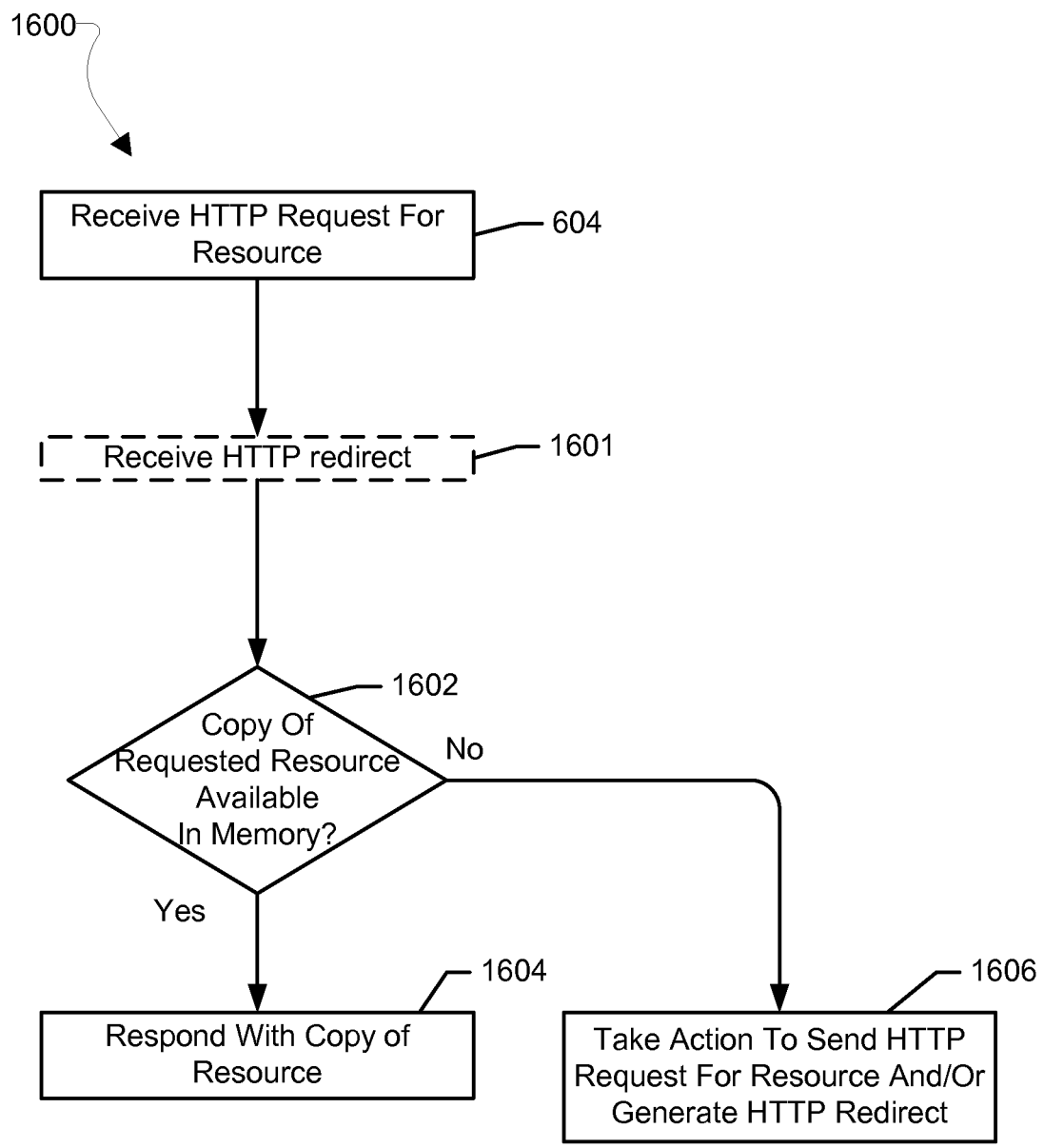
FIG. 16 is a process flow diagram illustrating an embodiment method for responding with cached copies of a requested resource.

FIG. 16 is a process flow diagram illustrating an embodiment method 1600 for responding with cached copies of a requested resource that may be performed by an HTTP proxy (e.g., an HTTP proxy module running on a processor of a receiver device, a network side HTTP proxy server, and/or an HTTP proxy of a gateway device). As discussed above, in block 604 the HTTP proxy may receive an HTTP request message for a resource. In an optional embodiment, in optional block 1601 the HTTP proxy may receive an HTTP redirect message, for example in the use of HTTP pipelining, whereby the HTTP client issues a sequence of HTTP requests and successive requests are sent without waiting for response(s) to previous one(s) to have been received, and in which case the redirect is in response to a prior request. As examples, the HTTP redirect message may be an HTTP 303 redirect message indicating a single alternate resource or an HTTP 300 redirect message indicating more than one alternate resource and network information.

In determination block 1602 the HTTP proxy may determine whether a copy of the requested resource is available in a memory available to the HTTP proxy. In an embodiment, a determination of whether a copy of the requested resource is available in a memory available to the HTTP proxy may be made when a request for the resource is received by the HTTP proxy. As an example, the HTTP proxy may determine whether a request for a resource violates network policy when the request for the resource is received, and determine whether a copy of the requested resource is available in the memory available to the HTTP proxy upon determining that the request violates a network policy. In another embodiment, a determination of whether a copy of the requested resource is available in the memory available to the HTTP proxy may be made after a redirect message is received. As an example, reception of an HTTP redirect message may trigger the HTTP proxy to check for a copy of the requested resource in a memory available to the HTTP proxy. As another example, the HTTP proxy may determine whether alternate resources indicated in the HTTP redirect message may be provided to the requesting device based on information in the HTTP redirect message, and may check for a copy of the requested resource in memory available to the HTTP proxy in response to determining that alternate resources indicated in the HTTP redirect message may not be provided to the requesting device.

In response to determining that a copy of the requested resource is available in the memory (i.e., determination block 1602="Yes"), the HTTP proxy may respond with a copy of the resource in block 1604. As an example, the HTTP proxy may send an HTTP response (e.g., HTTP 200 OK response) to a requesting HTTP client/application with the requested resource. In response to determining that a copy of the requested resource is not available in memory (i.e., determination block 1602="No"), the HTTP proxy may take an action to send an HTTP request for the resource and/or generate an HTTP redirect message in block 1606. As an example, when the HTTP proxy checks its memory for copies of requested resources upon receiving requests for those resources and a copy of the resource is not available, the HTTP proxy may send an HTTP request for the requested resource to an HTTP server hosting the requested resource. As another example, when the HTTP proxy checks its memory for copies of requested resources upon receiving requests for those resources and a copy of the resource is not available, the HTTP proxy may generate an HTTP redirect message based on response settings available to the HTTP proxy, and send the HTTP redirect request message back to the requesting client. As a further example, when the HTTP proxy checks its memory for copies of the requested resource after receiving a HTTP redirect request message, the HTTP proxy may generate a second HTTP redirect request message, and send the second HTTP redirect message to the requesting client.

Figure 17:
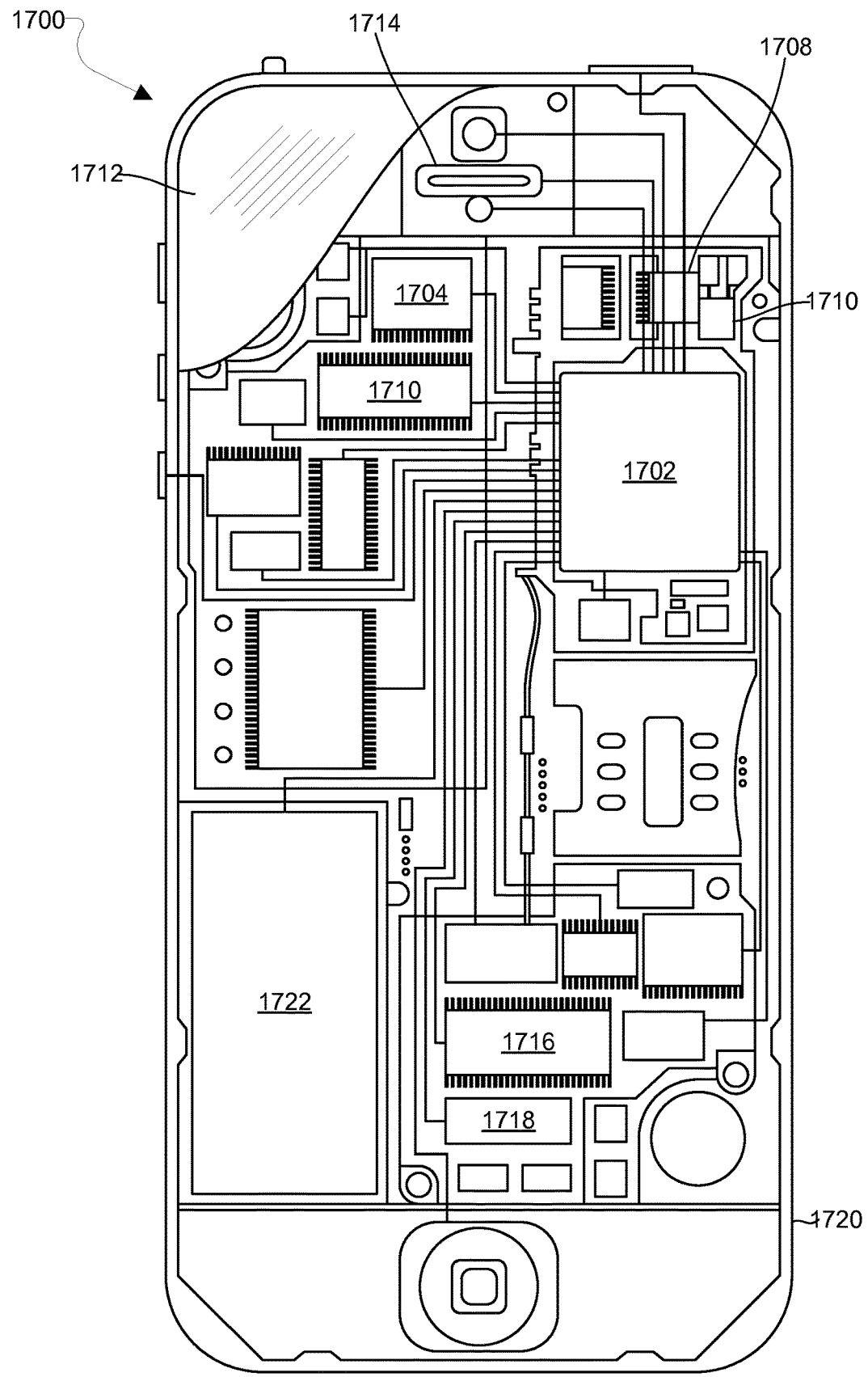
FIG. 17 is a component diagram of an example receiver device suitable for use with the various embodiments.

The various embodiments may be implemented in any of a variety of receiver devices, an example of which is illustrated in FIG. 17. For example, the receiver device 1700 may include a processor 1702 coupled to internal memories 1704 and 1706. Internal memories 1704 and 1706 may be volatile or non-volatile memories, and may also be secure and/or encrypted memories, or unsecure and/or unencrypted memories, or any combination thereof. The processor 1702 may also be coupled to a touch screen display 1712, such as a resistive-sensing touch screen, capacitive-sensing touch screen infrared sensing touch screen, or the like. Additionally, the display of the receiver device 1700 need not have touch screen capability. The receiver device 1700 may have one or more radio signal transceivers 1708 (e.g., Peanut®, Bluetooth®, Zigbee®, Wi-Fi, RF radio) and antennae 1710, for sending and receiving, coupled to each other and/or to the processor 1702. The receiver device 1700 may include a cellular network interface, such as wireless modem chip 1716, that enables communication via a cellular data network (e.g., CDMA, TDMA, GSM, PCS, 3G, 4G, LTE, or any other type of cellular data network) and is coupled to the processor 1702. The receiver device 1700 may include a peripheral device connection interface 1718 coupled to the processor 1702. The peripheral device connection interface 1718 may be singularly configured to accept one type of connection, or multiply configured to accept various types of physical and communication connections, common or proprietary, such as USB, FireWire, Thunderbolt, or PCIe. The peripheral device connection interface 1718 may also be coupled to a similarly configured peripheral device connection port. The receiver device 1700 may also include speakers 1714 for providing audio outputs. The receiver device 1700 may also include a housing 1720, constructed of a plastic, metal, or a combination of materials, for containing all or some of the components discussed herein. The receiver device 1700 may include a power source 1722 coupled to the processor 1702, such as a disposable or rechargeable battery. The rechargeable battery may also be coupled to the peripheral device connection port to receive a charging current from a source external to the receiver device 1700.

Figure 18:
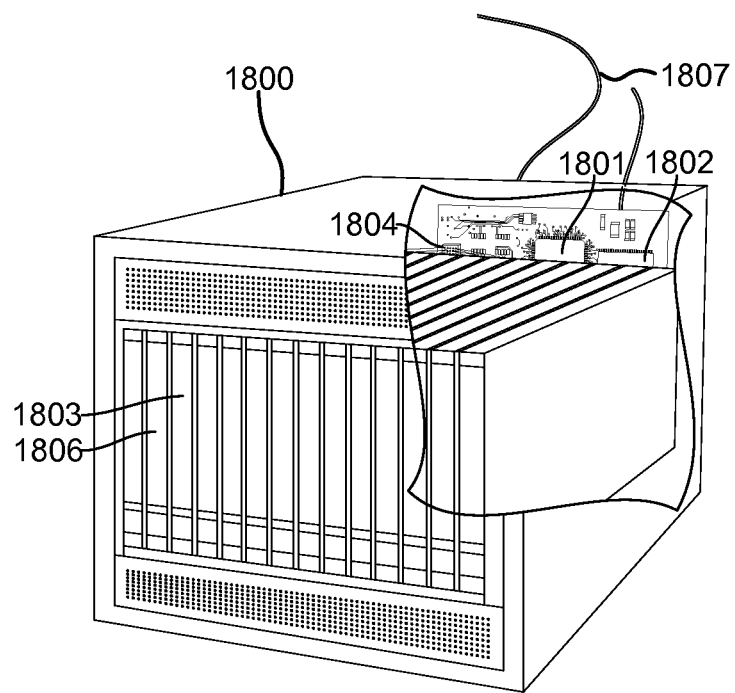
FIG. 18 is a component diagram of an example server suitable for use with the various embodiments.

The various embodiments may also be implemented on any of a variety of commercially available server devices, such as the server 1800 illustrated in FIG. 18. Such a server 1800 typically includes a processor 1801 coupled to volatile memory 1802 and a large capacity nonvolatile memory, such as a disk drive 1803. The server 1800 may also include a floppy disc drive, compact disc (CD) or DVD disc drive 1806 coupled to the processor 1801. The server 1800 may also include one or more network transceivers 1804, such as a network access port, coupled to the processor 1801 for establishing network interface connections with a communication network 1807, such as a local area network coupled to other system computers and servers, the Internet, the public switched telephone network, and/or a cellular network (e.g., CDMA, TDMA, GSM, PCS, 3G, 4G, LTE, or any other type of cellular network).

The processors 1702 and 1801 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 1704, 1710, 1802, or 1803 before they are accessed and loaded into the processors 1702 and 1801. The processors 1702 and 1801 may include internal memory sufficient to store the application software instructions. In many devices the internal memory may be a volatile or nonvolatile memory, such as flash memory, or a mixture of both. For the purposes of this description, a general reference to memory refers to memory accessible by the processors 1702 and 1801 including internal memory or removable memory plugged into the device and memory within the processors 1702 and 1801 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium (e.g., as processor-executable instructions stored on a non-transitory processor readable medium). The steps of a method or algorithm disclosed herein may be embodied in a processor-executable software module that may reside on a non-transitory computer-readable or processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions (e.g., stored processor-executable instructions) on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for providing a resource from a Hypertext Transfer Protocol (HTTP) server to an HTTP client, comprising:
   receiving, in a processor, an HTTP redirect message including two or more alternate resource IDs and one or more access policy information elements, wherein the two or more alternate resource IDs are different URIs of alternative versions of a requested resource; and
   selecting, in the processor, one of the two or more alternate resource IDs based at least in part on the one or more access policy information elements.

2. The method of claim 1, wherein:
   receiving, in the processor, an HTTP redirect message including two or more alternate resource IDs and one or more access policy information elements comprises receiving, in the processor, an HTTP redirect message including two or more alternate resource IDs and one or more access policy information elements in an HTTP proxy; and
   selecting, in the processor, one of the two or more alternate resource IDs based at least in part on the one or more access policy information elements comprises selecting, in the processor, one of the two or more alternate resource IDs in the HTTP proxy based at least in part on the one or more access policy information elements,
   the method further comprising sending a second HTTP redirect message including the selected alternate resource ID without the one or more access policy information elements to the HTTP client.

3. The method claim 2, further comprising receiving network information in the HTTP proxy, wherein selecting one of the two or more alternate resource IDs in the HTTP proxy based at least in part on the one or more access policy information elements comprises selecting one of the two or more alternate resource IDs in the HTTP proxy based at least in part on the one or more access policy information elements and received network information.

4. The method of claim 3, wherein the network information is one or more of network congestion information, access speed information, time information, quality of service information, location information, cost information, and subscriber information.

5. The method of claim 2, wherein the HTTP redirect message is an HTTP 300 redirect message and the second HTTP redirect message is an HTTP 303 redirect message.

6. The method of claim 1, wherein selecting, in the processor, one of the two or more alternate resource IDs based at least in part on the one or more access policy information elements comprises selecting, in the processor, one of the two or more alternate resource IDs based at least in part on the one or more access policy information elements and a redirect handling rule.

7. The method of claim 1, wherein the one or more access policy information elements are one or more of a priority indication, a validity time indication, a location rule, a guaranteed bit rate indication, a maximum bit rate indication, and a cost indication.

8. The method of claim 1, wherein the HTTP client is a Dynamic Adaptive Streaming Over Hypertext Transfer Protocol (DASH) client application and the received HTTP redirect message includes a Media Presentation Description (MPD) update indication.

9. A device, comprising a processor configured with processor-executable instructions to perform operations comprising:
  receiving a Hypertext Transfer Protocol (HTTP) redirect message including two or more alternate resource IDs and one or more access policy information elements, wherein the two or more alternate resource IDs are different URIs of alternative versions of a requested resource; and
  selecting one of the two or more alternate resource IDs based at least in part on the one or more access policy information elements.

10. The device of claim 9, wherein the processor is configured with processor-executable instructions to perform operations such that:
  receiving an HTTP redirect message including two or more alternate resource IDs and one or more access policy information elements comprises receiving an HTTP redirect message including two or more alternate resource IDs and one or more access policy information elements in an HTTP proxy; and
  selecting one of the two or more alternate resource IDs based at least in part on the one or more access policy information elements comprises selecting one of the two or more alternate resource IDs in the HTTP proxy based at least in part on the one or more access policy information elements, and
  wherein the processor is configured with processor-executable instructions to perform operations further comprising sending a second HTTP redirect message including the selected alternate resource ID without the one or more access policy information elements from the HTTP proxy to an HTTP client.

11. The device of claim 10, wherein the processor is configured with processor-executable instructions to perform operations further comprising receiving network information in the HTTP proxy, and
  wherein the processor is configured with processor-executable instructions to perform operations such that selecting one of the two or more alternate resource IDs in the HTTP proxy based at least in part on the one or more access policy information elements comprises selecting one of the two or more alternate resource IDs in the HTTP proxy based at least in part on the one or more access policy information elements and received network information.

12. The device of claim 11, wherein the processor is configured with processor-executable instructions to perform operations such that the network information is one or more of network congestion information, access speed information, time information, quality of service information, location information, cost information, and subscriber information.

13. The device of claim 10, wherein the processor is configured with processor-executable instructions to perform operations such that the HTTP redirect message is an HTTP 300 redirect message and the second HTTP redirect message is an HTTP 303 redirect message.

14. The device of claim 9, wherein the processor is configured with processor-executable instructions to perform operations such that selecting one of the two or more alternate resource IDs based at least in part on the one or more access policy information elements comprises selecting one of the two or more alternate resource IDs based at least in part on the one or more access policy information elements and a redirect handling rule.

15. The device of claim 9, wherein the processor is configured with processor-executable instructions to perform operations such that the one or more access policy information elements are one or more of a priority indication, a validity time indication, a location rule, a guaranteed bit rate indication, a maximum bit rate indication, and a cost indication.

16. The device of claim 9, wherein the processor is configured with processor-executable instructions to perform operations further comprising providing a resource corresponding to the selected one of the two or more alternate resource IDs to an a Dynamic Adaptive Streaming Over Hypertext Transfer Protocol (DASH) client, and
  wherein the processor is configured with processor-executable instructions to perform operations such that the received HTTP redirect message includes a Media Presentation Description (MPD) update indication.

17. A non-transitory processor readable medium having stored thereon processor-executable instructions configured to cause a processor to perform operations, comprising:
  receiving a Hypertext Transfer Protocol (HTTP) redirect message including two or more alternate resource IDs and one or more access policy information elements, wherein the two or more alternate resource IDs are different URIs of alternative versions of a requested resource; and
  selecting one of the two or more alternate resource IDs based at least in part on the one or more access policy information elements.

18. The non-transitory processor readable medium of claim 17, wherein the stored processor-executable instructions are configured to cause a processor to perform operations such that:
  receiving an HTTP redirect message including two or more alternate resource IDs and one or more access policy information elements comprises receiving an HTTP redirect message including two or more alternate resource IDs and one or more access policy information elements in an HTTP proxy; and
  selecting one of the two or more alternate resource IDs based at least in part on the one or more access policy information elements comprises selecting one of the two or more alternate resource IDs in the HTTP proxy based at least in part on the one or more access policy information elements, and
  wherein the stored processor-executable instructions are configured to cause a processor to perform operations further comprising sending a second HTTP redirect message including the selected alternate resource ID without the one or more access policy information elements to an HTTP client.

19. The non-transitory processor readable medium of claim 18, wherein the stored processor-executable instructions are configured to cause a processor to perform operations such that the HTTP redirect message is an HTTP 300 redirect message and the second HTTP redirect message is an HTTP 303 redirect message.

20. The non-transitory processor readable medium of claim 17, wherein the stored processor-executable instructions are configured to cause a processor to perform operations such that selecting one of the two or more alternate resource IDs based at least in part on the one or more access policy information elements comprises selecting one of the two or more alternate resource IDs based at least in part on the one or more access policy information elements and a redirect handling rule.

* * * * *